(12) United States Patent
Faridi et al.

(10) Patent No.: US 9,828,973 B2
(45) Date of Patent: Nov. 28, 2017

(54) GRAVITY-DRIVEN POWER GENERATION (GPG) SYSTEM

(71) Applicant: Kavan Novin Energy Paydar Group, Oroumieh (IR)

(72) Inventors: Shapour Faridi, Oroumieh (IR); Abdolreza Fallah, Tehran (IR)

(73) Assignee: KAVAN NOVIN ENERGY PAYDAR GROUP, Oroumieh (IR)

( * ) Notice: Subject to any disclaimer, the term of this patent is extended or adjusted under 35 U.S.C. 154(b) by 0 days.

(21) Appl. No.: 15/614,508

(22) Filed: Jun. 5, 2017

(65) Prior Publication Data
US 2017/0268488 A1    Sep. 21, 2017

Related U.S. Application Data

(63) Continuation of application No. 15/298,567, filed on Oct. 20, 2016, now Pat. No. 9,670,910.
(Continued)

(51) Int. Cl.
*F03G 3/00* (2006.01)
*H02K 7/18* (2006.01)
*F03G 7/10* (2006.01)

(52) U.S. Cl.
CPC ............ *F03G 3/00* (2013.01); *H02K 7/1807* (2013.01); *F03G 7/10* (2013.01)

(58) Field of Classification Search
CPC ............ F03G 3/00; F03G 7/10; H02K 7/1807
See application file for complete search history.

(56) References Cited

U.S. PATENT DOCUMENTS

| 8,692,395 B2 | 4/2014 | Yeh |
| 2009/0115195 A1 | 5/2009 | Wang |
| 2017/0191468 A1* | 7/2017 | Sequeira ............... F03G 3/00 |

FOREIGN PATENT DOCUMENTS

| CN | 1409004 A | 4/2003 |
| CN | 101368547 A | 2/2009 |

(Continued)

OTHER PUBLICATIONS

Rakesh S. Ambade, A Review on Gravity Power Generation, nternational Journal of Innovative Research in Science, Engineering and Technology, Apr. 2014, vol. 3, Issue 4, pp. 1184-1186.
(Continued)

*Primary Examiner* — Viet Nguyen
(74) *Attorney, Agent, or Firm* — Bajwa IP Law Firm; Haris Zaheer Bajwa

(57) ABSTRACT

An apparatus for gravity-based power generation is described in this disclosure. The apparatus may include: a main shaft; a plurality of radially extending arm assemblies that may be attached to the main shaft from their proximal ends and may be rotatable with the main shaft in a vertical trajectory. Each arm assembly may include an arm and a weight assembly mounted on the arm. Each arm may be configured with an adjustable length and each weight assembly may be configured with an adjustable mass and an adjustable position on its respective arm. The arm assemblies may be kept in a continuous rotational movement along the vertical trajectory by changing at least one of the adjustable length, the adjustable mass, and the adjustable position in predefined regions along the vertical trajectory.

10 Claims, 20 Drawing Sheets

Related U.S. Application Data

(60) Provisional application No. 62/341,106, filed on May 25, 2016.

(56) References Cited

FOREIGN PATENT DOCUMENTS

| | | |
|---|---|---|
| CN | 102050227 A | 5/2011 |
| CN | 104100466 A | 10/2014 |
| CN | 104214057 A | 12/2014 |
| KR | 20100002907 U | 3/2010 |

OTHER PUBLICATIONS

Muqtar Ahmed, Power Generation through Gravity and Kinetic Energy, International Journal of Scientific and Research Publications, Jan. 2014, vol. 4, Issue 1, p. 15.
Prathamesh Natu, Generation of Electricity Using Gravity, International Journal of Mechanical Engineering and Technology, Jul. 2015, vol. 6, Issue 7, pp. 79-84.

* cited by examiner

GRAVITY-DRIVEN POWER GENERATION (GPG) SYSTEM

CROSS REFERRENCE TO RELATED APPLICATION

This application is a continuation of U.S. patent application Ser. No. 15/298,567, entitled "GRAVITY-DRIVEN POWER GENERATION (GPG) SYSTEM", filed Oct. 20, 2016, which claims the benefit of priority from pending U.S. Provisional Patent Application Ser. No. 62/341,106, filed on May 25, 2016, and entitled "GENERATION OF ELECTRICITY BASED ON GRAVITY," which are incorporated by reference herein in their entirety.

TECHNICAL FIELD

The present application generally relates to a power generation mechanism, specifically to a gravity-driven power generation mechanism, and more specifically to a gravity power generation system and apparatus.

BACKGROUND

Many power stations around the world rely on fossil fuels as their energy resource. Fossil fuels are non-renewable energy sources that pollute the environment. Other energy resources, such as wind, water, nuclear energy, etc., may suffer from disadvantages of being dependent on geographical conditions or being dangerous or require a high level of maintenance.

Gravitational potential energy may be considered as an independent renewable energy source that may be used to generate power and electricity. In order to utilize the gravitational energy, new systems and devices must be introduced in the art that are capable of continuously converting the gravitational potential energy into mechanical and electrical energy.

SUMMARY

The following brief summary is not intended to include all features and aspects of exemplary embodiments of the present disclosure, nor does it imply that the claimed aspects must include all features and aspects discussed in this summary.

In one general aspect, the present disclosure describes a system and apparatus for gravity-based power generation. The system and apparatus, according to this general aspect, may include: a main shaft; a plurality of radially extending arm assemblies that may be attached to the main shaft from their proximal ends and may be rotatable therewith in a vertical trajectory. Each arm assembly may include an arm and a weight assembly attached to the distal end of the arm. Each arm may be configured with an adjustable length. The arm assemblies may be kept in a continuous rotational movement along the vertical trajectory by changing the adjustable length in predefined regions along the vertical trajectory and the rotational movement of the arm assemblies urges the shaft to rotate about its longitudinal axis.

In another implementation, the main shaft may be connected to an electric generator, either directly or through a gearbox. In another implementation, the main shaft may be connected to an electric generator through a clutching system and a gearbox.

In some implementations, the plurality of radially extending arm assemblies may be equally spaced around the main shaft. The plurality of radially extending arm assemblies may include at least two radially extending arms equally spaced around the main shaft. In other implementations, the plurality of radially extending arm assemblies include three radially extending arms equally spaced around the main shaft. The three radially extending arm assemblies may be separated by an angle of 120°.

According to one implementation, the predefined regions may include an increase region and a decrease region. The increase region may be a region where the adjustable length may be increased and the decrease region may be a region where the adjustable length may be decreased.

According to some implementations, the vertical trajectory may be a vertical circular trajectory that covers a 360° arc about the longitudinal axis of the main shaft. The predefined regions may include an increase region covering 30° of the vertical circular trajectory and a decrease region covering 30° of the vertical circular trajectory. In another implementation, the predefined regions may include an increase region covering 60° of the vertical circular trajectory and a decrease region covering 60° of the vertical circular trajectory.

According to some implementations, the predefined regions may include an increase region covering 30° of the vertical circular trajectory from 0° to 30° and a decrease region covering 30° of the vertical circular trajectory from 180° to 210°. According to other implementations, the predefined regions may include an increase region covering 60° of the vertical circular trajectory from 330° to 30° and a decrease region covering 60° of the vertical circular trajectory from 150° to 210°.

According to some implementations, the system and apparatus of the present disclosure may further include a vertical base and the main shaft may be mounted on the vertical base.

According to one implementation, each arm may include: a fixed arm section defining a sliding track; and a retractable arm section slidably receivable within the sliding track. The length of the arm may be adjustable by sliding the retractable arm section in and out of the sliding track.

According to one implementation, the fixed arm section may include two parallel beams that may be configured to define the sliding track. A linear actuator may be mounted on the arm and may be coupled to the retractable arm section. The linear actuator may be configured to drive the sliding movement of the retractable arm section in and out of the sliding track. According to an implementation, the linear actuator may be a rotary actuator coupled with a ball screw mechanism. According to another implementation, the linear actuator may be a rotary actuator coupled with a gear and chain mechanism.

In another general aspect, the system and apparatus, according to this general aspect, may include: a main shaft; a plurality of radially extending arm assemblies that may be attached to the main shaft from their proximal ends and may be rotatable therewith in a vertical trajectory. Each arm assembly may include an arm and a weight assembly attached to the distal end of the arm. Each weight assembly may be configured with an adjustable mass. The arm assemblies may be kept in a continuous rotational movement along the vertical trajectory by changing the adjustable mass in predefined regions along the vertical trajectory and the rotational movement of the arm assemblies urges the shaft to rotate about its longitudinal axis.

According to an implementation, the predefined regions may include an increase region that is a region in which the adjustable mass may be increased and a decrease region that is a region in which the adjustable mass may be decreased. In an implementation, the increase region may be a region covering 30° of the vertical circular trajectory from 0° to 30°. According to an implementation, the decrease region may be a region covering 30° of the vertical circular trajectory from 120° to 150°.

In an implementation, the increase region may be a region covering 60° of the vertical circular trajectory from 330° to 30°. According to an implementation, the decrease region may be a region covering 60° of the vertical circular trajectory from 90° to 150°.

According to one implementation, each weight assembly may be configured to receive a fluid therein and the adjustable mass may be decreased by loading the fluid into the weight assembly and the adjustable mass may be decreased by discharging the fluid out of the weight assembly.

According to some implementations, each weight assembly may include: a cylinder having an inlet and an outlet; and a piston movably disposed within the cylinder. The piston may include a piston rod that may be coupled to a linear actuating mechanism. The linear actuating mechanism may be configured to drive a forward linear movement and a backward linear movement of the piston inside the cylinder. The piston rod may be coupled to a linear actuating mechanism that may be configured to drive a forward linear movement and a backward linear movement of the piston inside the cylinder. The forward movement of the piston may load the fluid via the inlet into the cylinder and the backward movement of the piston may discharge the fluid via the outlet out of the cylinder.

According to some implementations, the linear actuating mechanism may include a pneumatic jack connected to an air compressor.

According to yet another general aspect, the system and apparatus, according to this general aspect, may include: a main shaft; a plurality of radially extending arm assemblies that may be attached to the main shaft from their proximal ends and may be rotatable therewith in a vertical trajectory. Each arm assembly may include an arm and a weight assembly mounted on the arm. Each weight assembly may be configured with an adjustable position on its respective arm. The arm assemblies may be kept in a continuous rotational movement along the vertical trajectory by changing the adjustable position in predefined regions along the vertical trajectory and the rotational movement of the arm assemblies urges the shaft to rotate about its longitudinal axis.

BRIEF DESCRIPTION OF THE DRAWINGS

While the specification concludes with claims particularly pointing out and distinctly claiming the subject matter that is regarded as forming the present application, it is believed that the application will be better understood from the following description taken in conjunction with the accompanying DRAWINGS, where like reference numerals designate like structural and other elements, in which:

DETAILED DESCRIPTION

Figure 1A:
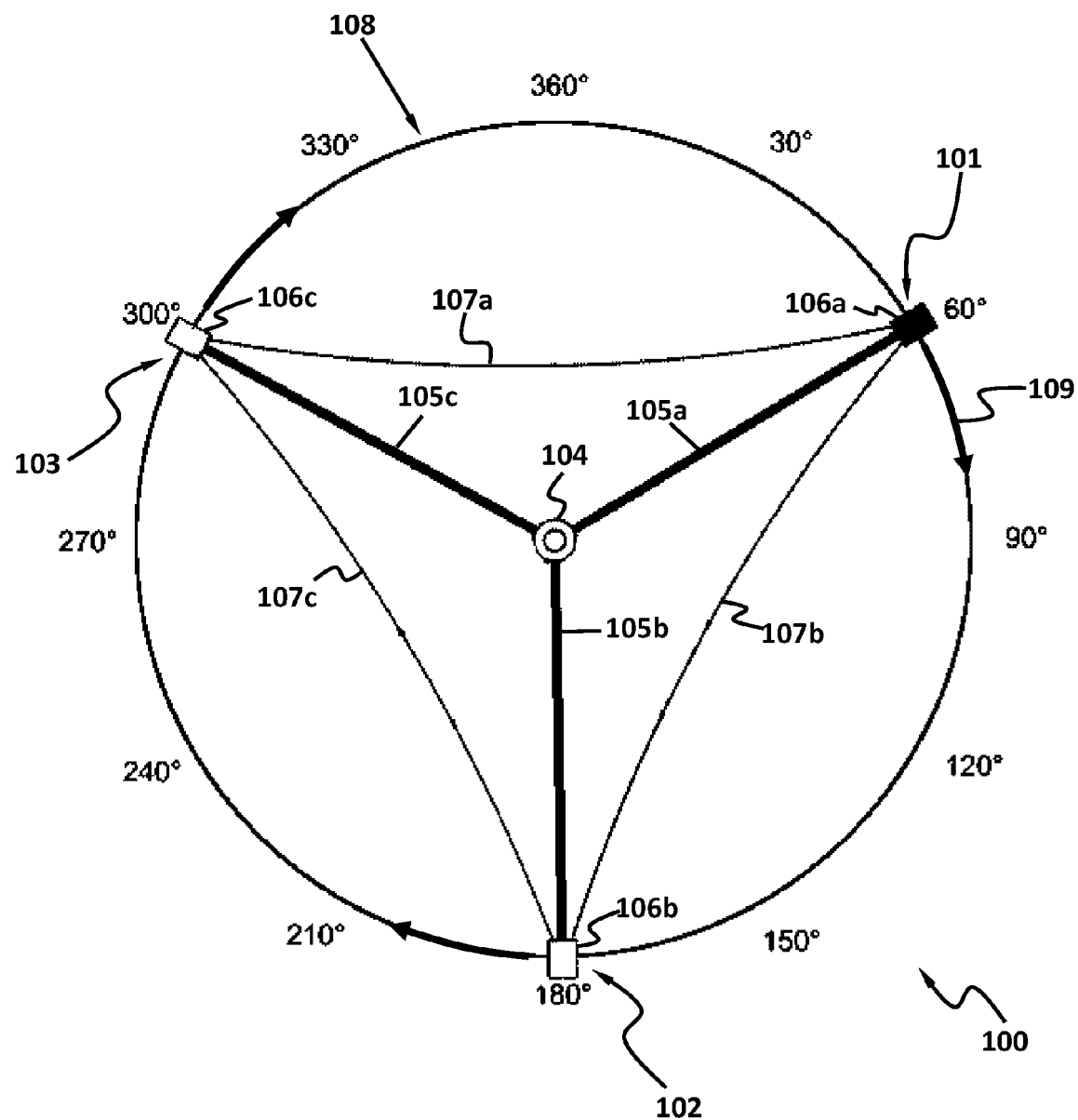
FIGS. 1A-1C illustrate an exemplary gravitational power generating system, according to one or more aspects of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

For purposes of explanation, specific nomenclature is set forth to provide a thorough understanding of the present disclosure. However, it will be apparent to one skilled in the art that these specific details are not required to practice the principle consistent with the present disclosure. Descriptions of exemplary embodiments are provided only as representative examples. Various modifications to the exemplary embodiments will be readily apparent to one skilled in the art, and the general principles defined herein may be applied to other implementations and applications without departing from the scope of the principles of the present disclosure. The present disclosure is not intended to be limited to the implementations shown, but is to be accorded the widest possible scope consistent with the principles and features disclosed herein.

Described in exemplary embodiments of the present disclosure is a system and apparatus for generating power from gravitational potential energy. The gravitational power generating system and apparatus as described according to several aspects of the present disclosure may be suited for utilizing gravitational potential energy to generate mechanical power.

The gravitational power generating system may include a main shaft, a number of radially extended arm assemblies attached to the main shaft and rotatable therewith. The arm assemblies may be configured to be rotatable in a vertical circular trajectory about the longitudinal axis of the main shaft. In order to create a rotational movement in the main shaft, the arm assemblies may be configured such that a larger gravitational energy is converted into rotational kinetic energy as the arm assemblies rotate downwardly in one half of the circular trajectory (i.e., falling trajectory) compared to the gravitational energy needed for rotating the arm assemblies upwardly in the other half (i.e., rising trajectory). In an aspect, an external input power may be utilized to increase the potential energy of the arm assemblies in the falling trajectory and to reduce the potential energy required for pulling up the arm assemblies in the rising trajectory to keep the arm assemblies in continuous rotation along the vertical circular trajectory. As the arm assemblies travel in the vertical circular trajectory, the main shaft attached with the arm assemblies also rotates about its longitudinal axis, thereby generating torque. The input power utilized to trigger the continuous rotation of the main shaft may be amplified by the gravitational power generator. In an aspect, the rotational movement of the main shaft may produce enough torque that could be geared up to provide either mechanical power or to drive an electrical power generator. In the following, the working principle behind the gravity-driven power generating system (hereinafter "GPG" system) of the present disclosure is described in detail utilizing some exemplary implementations, without intending to be bound by any particular theory.

Figure 1B:
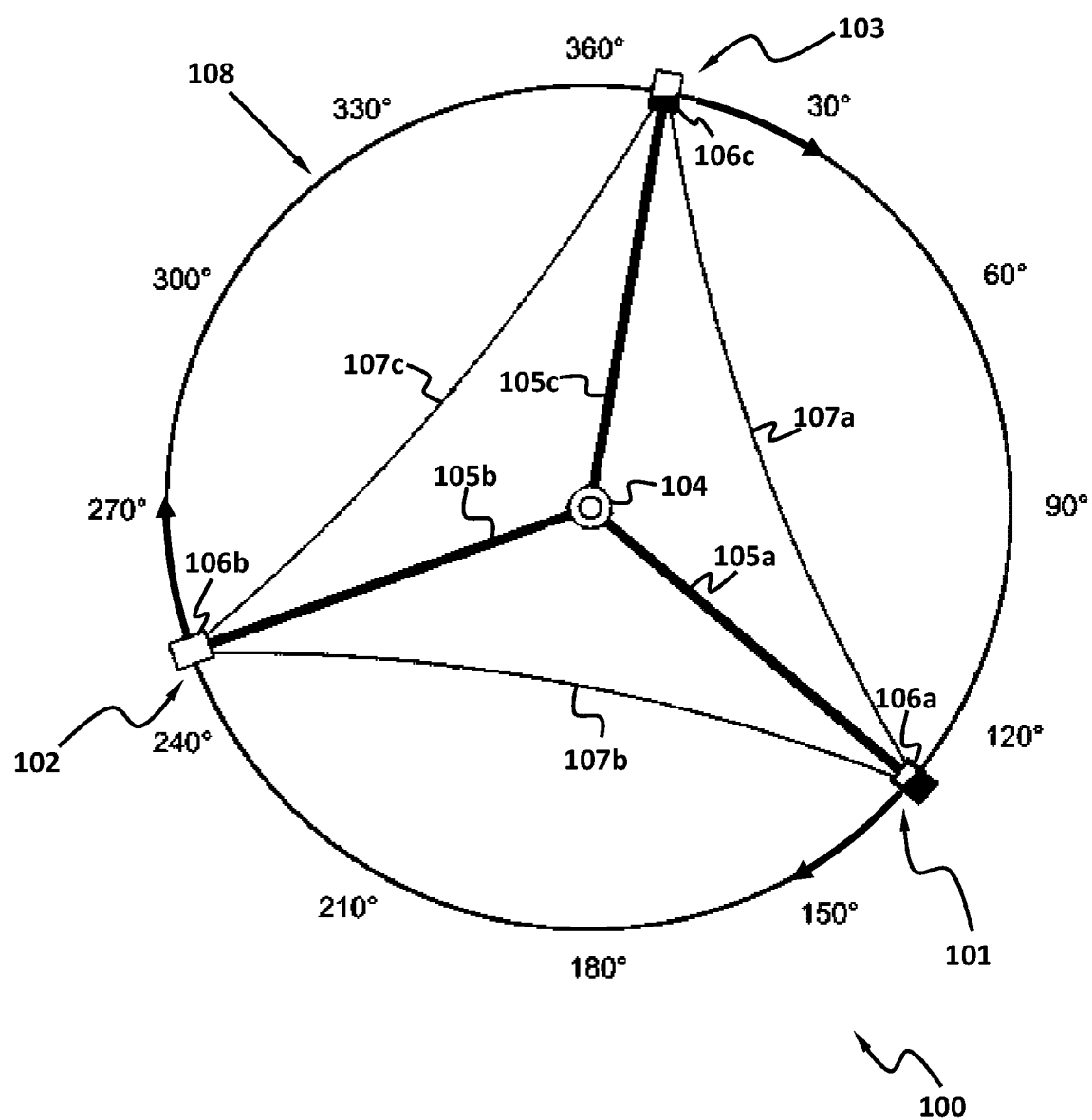
Figure 1C:
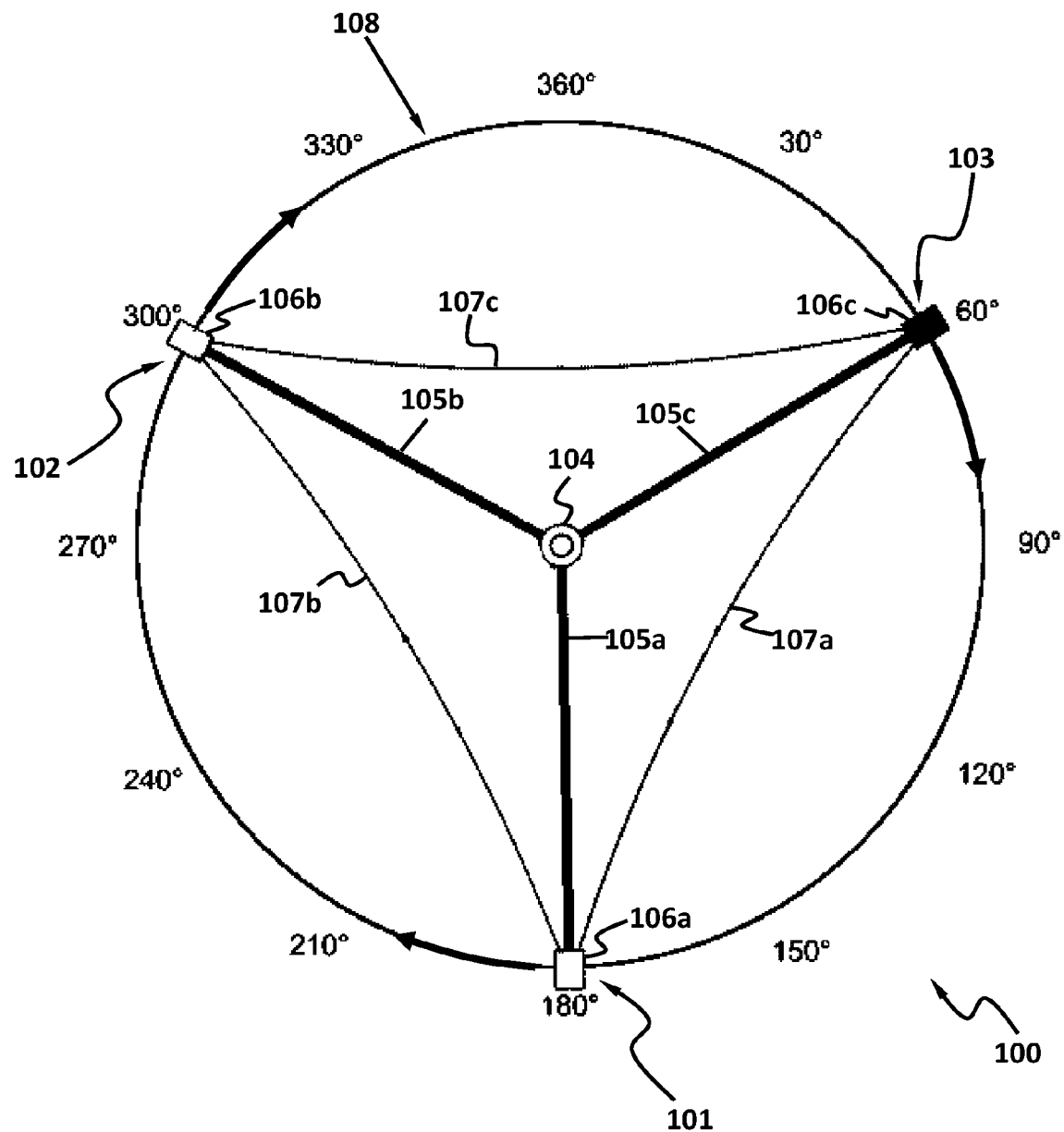

FIGS. 1A-1C are schematic representations of an example implementation of a GPG system, according to one or more aspects of the present disclosure. Referring to FIG. 1A, the GPG system 100 may include a main shaft 104 and a number of radially extended arm assemblies that may be attached to the main shaft 104. The arm assemblies may be equally spaced around the main shaft 104. Referring to the exemplary implementation shown in FIG. 1A, three arm assemblies 101, 102, and 103 may be attached to the main shaft 104. The arm assemblies 101, 102, and 103 may be separated by an angle of about 120°.

Referring to FIGS. 1A-1C, each arm assembly, for example arm assembly 101, may include an arm 105a with an adjustable length, and a weight assembly 106a mounted on the arm 105a. The weight assembly 106a may have an adjustable mass and an adjustable position on its respective arm 105a. Similarly, arm assembly 102, may include an arm 105b with an adjustable length, and a weight assembly 106b mounted on the arm 105b. The weight assembly 106b may have an adjustable mass and an adjustable position on the arm 105b. Arm assembly 103 may include an arm 105c with an adjustable length, and a weight assembly 106c mounted on the arm 105c. The weight assembly 106c may have an adjustable mass and an adjustable position on the arm 105c. In an implementation, arm assemblies 101, 102, and 103 may be configured with similar structures.

Referring to FIGS. 1A-1C, the arm assemblies 101, 102, and 103 may be configured to be rotatable with the main shaft 104 along a vertical circular trajectory 108. It should be known that the arm assemblies 101, 102, and 103 may rotate clock-wise or counter-clockwise along trajectory 108. In the implementation shown in FIGS. 1A-1C, the arm assemblies are configured to travel along the circular trajectory 108 in a clockwise manner. Therefore, the arm assemblies 101, 102, and 103 may fall down along the right half of trajectory 108 and rise up in the left half of trajectory 108. As used herein, the right half of trajectory 108 from 360° (i.e., 0° C.) to 180°, is called right side trajectory, and the left half of trajectory 108 from 180° to 360°, is called left side trajectory.

According to a general aspect, the GPG system may operate by dynamically changing three variables (i.e., length of the arms, position of the weight assemblies on the arms, and mass of the weight assemblies), either individually or in combination.

Referring to FIGS. 1A-1C, in an aspect, well planned and dynamic changes in the mass of weight assemblies 106a-c may be utilized to keep the GPG system 100 in continuous operation (i.e., continuous rotation of main shaft 104). Weight assemblies 106a-c may be configured to allow for making changes to their masses. According to some implementations, the mass of weight assemblies 106a-c may be changed, for example by introducing/discharging a fluid into or out of the weight assemblies 106a-c. Once a weight assembly is filled with the fluid, its mass is at a maximum level and once a weight assembly is empty, its mass is at a minimum level. According to other implementations, the weight assemblies 106a-c may be in fluid connection via a number of connecting tubes 107a-c that may be configured to allow for a weight assembly to discharge its contents to the next weight assembly and so on.

FIG. 1A shows an exemplary starting position for the arm assemblies 101, 102, and 103. Referring to FIG. 1A, arm assembly 101 may be positioned at a vertical angle of 60°. Weight assembly 106a that is mounted on the arm 105a may be filled with a fluid to increase its mass to its maximum level. Arm assembly 102 may be separated from arm assembly 101 by 120° and it may be positioned at a vertical angle of 180° with its weight assembly 106b completely empty corresponding to a minimum mass. Arm assembly 103 may be separated from arm assembly 102 by 120° and it may be positioned at a vertical angle of 300° with its weight assembly 106c completely empty corresponding to a minimum mass. In this position, arm assembly 101 possesses a higher potential energy due to its higher mass. As arm assembly 101 is released, its potential energy may be converted into a high rotational kinetic energy, and it may fall and travel along the right side trajectory in the direction shown by arrow 109. As arm assembly 101 falls, arm assemblies 102 and 103 having less masses, may be pulled up along the left side trajectory.

FIG. 1B, shows an exemplary intermediate position for the arm assemblies 101, 102, and 103. Referring to FIG. 1B, as arm assembly 101 reaches the end of the right side trajectory, the fluid in weight assembly 106a may be discharged via connecting tube 107a into weight assembly 106c of arm assembly 103, which has now reached the top of trajectory 108. As arm assembly 101 reaches the end of the right side trajectory at a vertical angle of 180° its contents may be completely discharged into weight assembly 106c of arm assembly 103 (as shown in FIG. 1C). Referring to FIG. 1C, in this position, arm assembly 103 is at its maximum mass, and similar to what was described for arm assembly 101, the arm assembly 103 may now fall down with a high rotational kinetic energy and travel along the circular trajectory 108 and pull up arm assemblies 101 and 102 having less mass and therefore requiring less potential energy to move up against gravity. This dynamic change in mass of weight assemblies 106a-c keeps the arm assemblies 101-103 in continuous rotation along trajectory 108. As the arms assemblies 101, 102, and 103 travel the circular trajectory 108, the main shaft 104 attached with the arm assemblies 101, 102, and 103 also rotates about its longitudinal axis. In this implementation, dynamic changes in the mass of the arm assemblies 101, 102, and 103 may keep the main shaft 104 in continuous rotation.

Figure 2A:
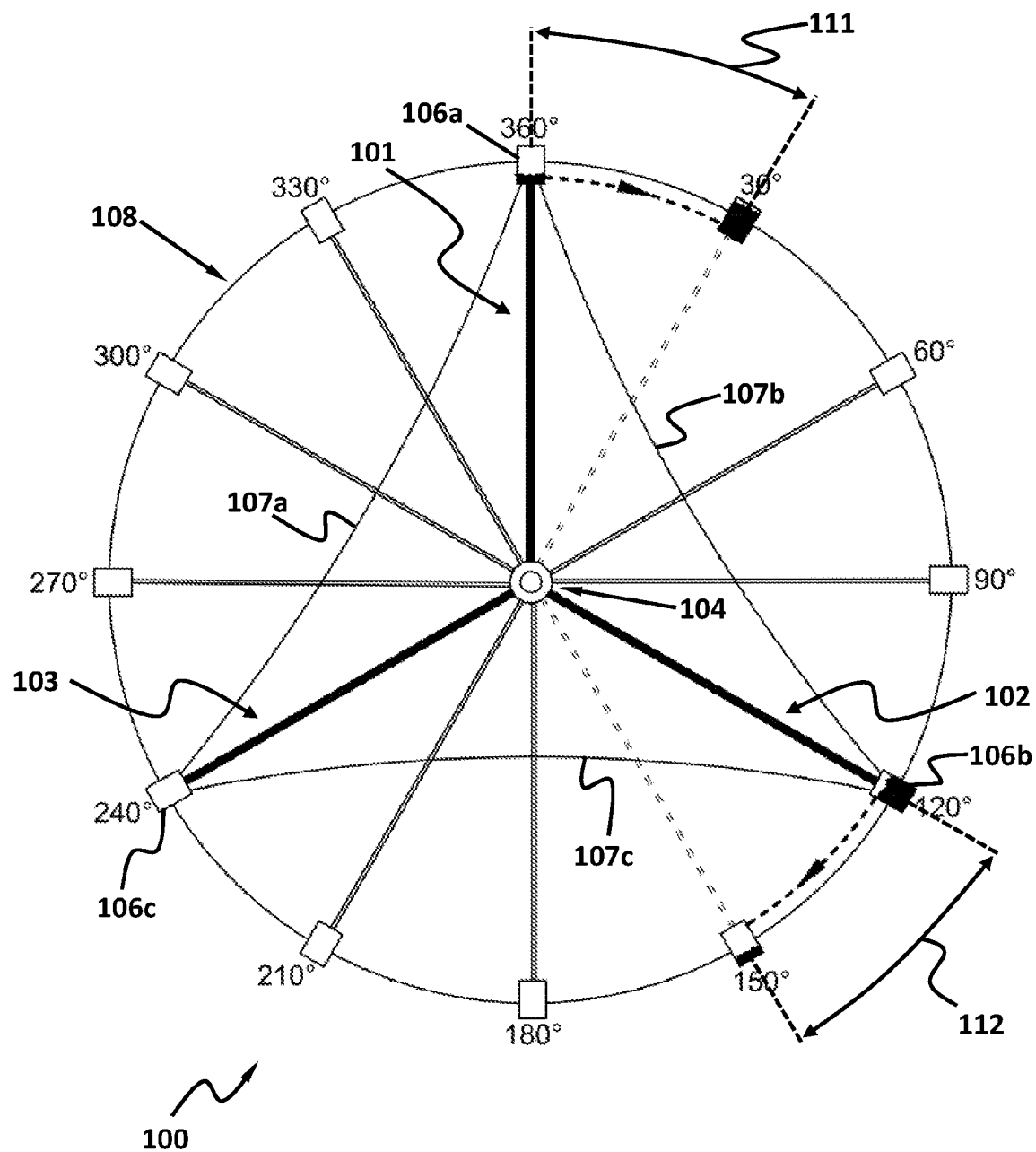
FIGS. 2A and 2B show exemplary implementations of the gravitational power generating system that utilizes dynamic change of mass of weight assemblies, according to one or more aspects of the present disclosure.
Figure 2B:
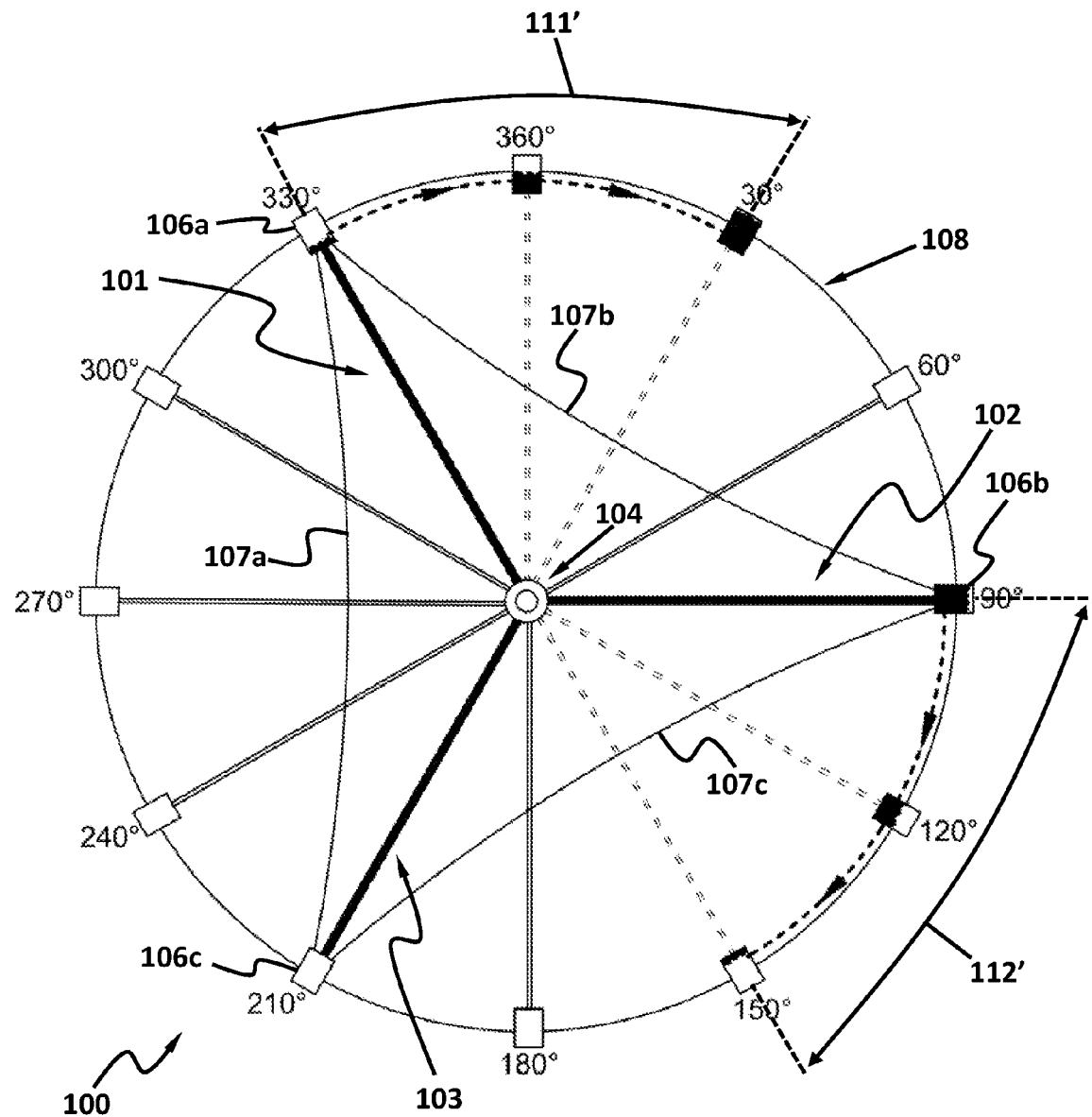

FIGS. 2A and 2B show how the dynamic change of the mass of weight assemblies 106a-c may be planned to keep the main shaft 104 in a continuous rotation. Referring to FIGS. 2A and 2B, an increase region 111 and a decrease region 112 may be defined. The increase region 111 may be defined as a region in which the mass of a weight assembly is increased via, for example, loading a fluid inside the weight assembly. Referring to the implementation shown in FIG. 2A, the increase region 111 may be a 30° arc along trajectory 108 from a vertical angle of, for example about 360° to a vertical angle of about 30°. Referring to another implementation shown in FIG. 2B, the increase region 111' may be a 60° arc from a vertical angle of, for example about 330° to a vertical angle of about 30°. The moment an arm assembly crosses the increase region 111 or 111' along the circular trajectory 108, the fluid may be loaded inside its respective weight assembly in order to increase the mass of the arm assembly.

Referring to FIGS. 2A and 2B, the decrease region 112 may be defined as a region in which the mass of a weight assembly is decreased via, for example, discharging the fluid out of the weight assembly. Referring to the implementation shown in FIG. 2A, the decrease region 112 may be a 30° arc from a vertical angle of, for example about 120° to a vertical angle of about 150°. Referring to the implementation shown in FIG. 2B, the decrease region 112' may be a 60° arc from a vertical angle of, for example about 90° to a vertical angle of about 150°. The moment an arm assembly crosses the decrease region 112 or 112' along the circular trajectory 108, the fluid is discharged from its corresponding weight assembly in order to decrease the mass of the arm assembly.

In the implementation shown in FIGS. 2A and 2B, a relatively small amount of external energy may be needed for loading/discharging the fluid into and out of weight assemblies 106a-c. This external energy may be consumed, for example, as input energy of a pump or any other devices or mechanisms that may be utilized to load/discharge the fluid in and out of weight assemblies.

Referring to the implementation shown in FIG. 2A, as the arm assembly 101 crosses the increase region 111, a fluid may be loaded inside its respective weight assembly 106a, thereby increasing its mass. Concurrently, arm 102 may cross decrease region 112 and the fluid may be discharged from its respective weight assembly 106b, and its mass may be decreased. Heavier arm 101 may fall along the circular trajectory 108 with a high kinetic energy and may raise lighter arm assemblies 102 and 103 against gravity. Then, as the arm assembly 101, crosses the decrease region 112 and its mass is decreased, the arm assembly 103 crosses the increase region 111, fluid may be loaded inside its respective weight assembly 106c and its mass may be increased. Now, heavier arm 103 may fall along the circular trajectory 108 with a high kinetic energy and may raise lighter arm assemblies 101 and 102 against gravity. Then, as the arm assembly 103, crosses the decrease region 112 and its mass is decreased, the arm assembly 102 crosses the increase region 111, fluid may be loaded inside its respective weight assembly 106b and its mass may be increased. Now, heavier arm 102 may fall along the circular trajectory 108 with a high kinetic energy and may raise lighter arm assemblies 101 and 103 against gravity. As the arm assemblies 101-103 travel along the circular trajectory 108 in this manner, the main shaft 104 attached with the arm assemblies 101-103 may also rotate about its longitudinal axis.

Referring to the implementation shown in FIG. 2B, as the arm assembly 101 crosses the increase region 111', a fluid may be loaded inside its respective weight assembly 106a, thereby increasing its mass. Concurrently, arm 102 may cross decrease region 112' and the fluid may be discharged from its respective weight assembly 106b, and its mass may be decreased. Heavier arm 101 may fall along the circular trajectory 108 with a high kinetic energy and may raise lighter arm assemblies 102 and 103 against gravity. Then, as the arm assembly 101 crosses the decrease region 112' and its mass is decreased, the arm assembly 103 crosses the increase region 111' fluid may be loaded inside its respective weight assembly 106c and its mass is increased. Now, heavier arm 103 may fall along the circular trajectory 108 with a high kinetic energy and may raise lighter arm assemblies 101 and 102 against gravity. Then, as the arm assembly 103, crosses the decrease region 112' and its mass is decreased, the arm assembly 102 crosses the increase region 111', fluid may be loaded inside its respective weight assembly 106b and its mass may be increased. Now, heavier arm 102 may fall along the circular trajectory 108 with a high kinetic energy and may raise lighter arm assemblies 101 and 103 against gravity. As the arm assemblies 101-103 travel along the circular trajectory 108 in this manner, the main shaft 104 attached with the arm assemblies 101-103 may also rotate about its longitudinal axis.

According to an implementation, the weight assemblies 106a-c may be configured such that the discharge line 107b of weight assembly 102 may be connected to the input of weight assembly 101; the discharge line 107a of weight assembly 101 may be connected to the input of weight assembly 103; and the discharge line 107c of weight assembly 103 may be connected to input of weight assembly 102. According to an implementation, once an arm assembly crosses a decrease region, the fluid inside its respective weight assembly may be discharged into another weight assembly of an arm assembly which is crossing an increase region. Therefore, a fixed amount of oil can be used in the system.

Figure 3A:
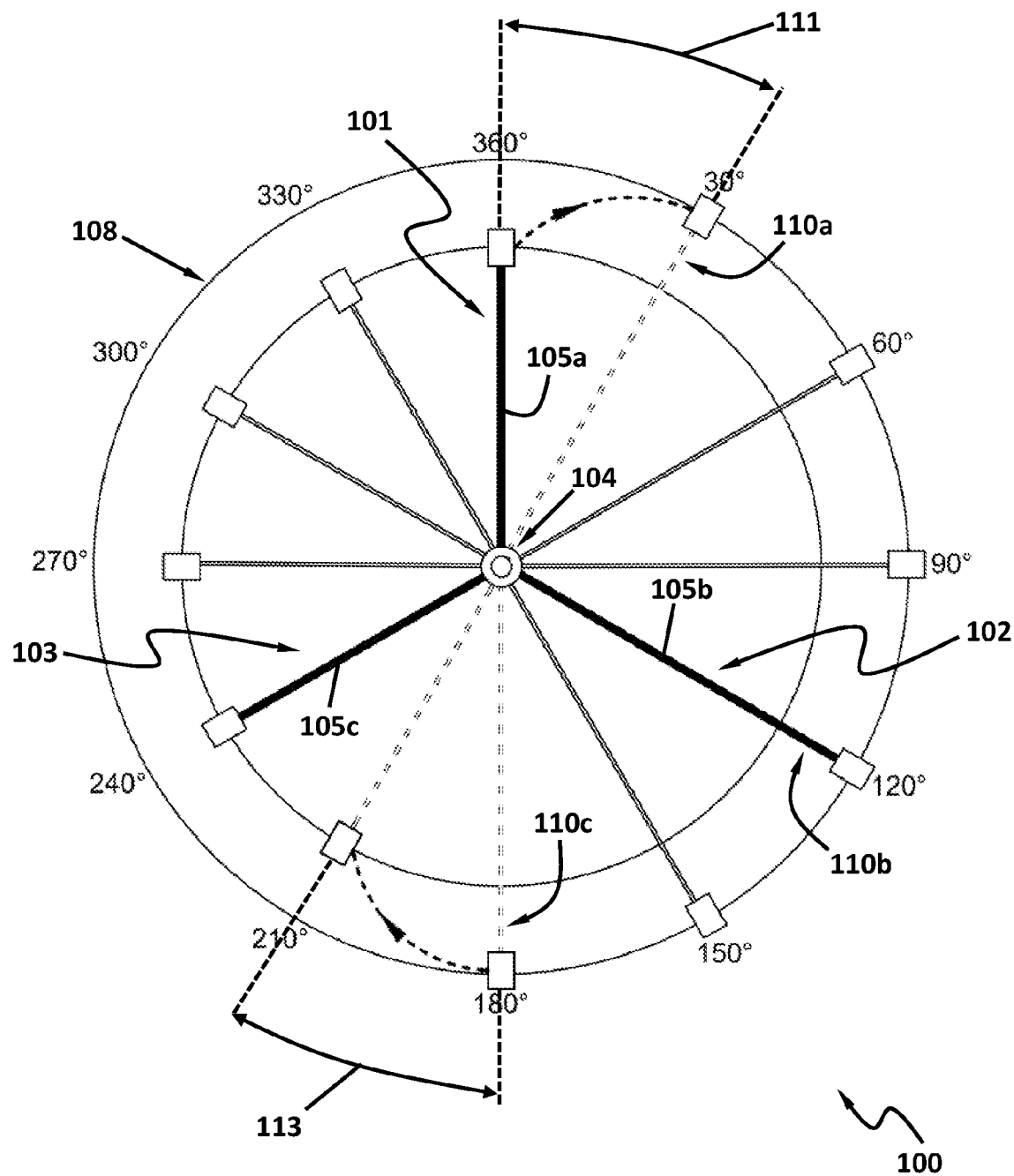
FIGS. 3A and 3B show exemplary implementations of the gravitational power generating system that utilizes dynamic change of length of arm assemblies, according to one or more aspects of the present disclosure.
Figure 3B:
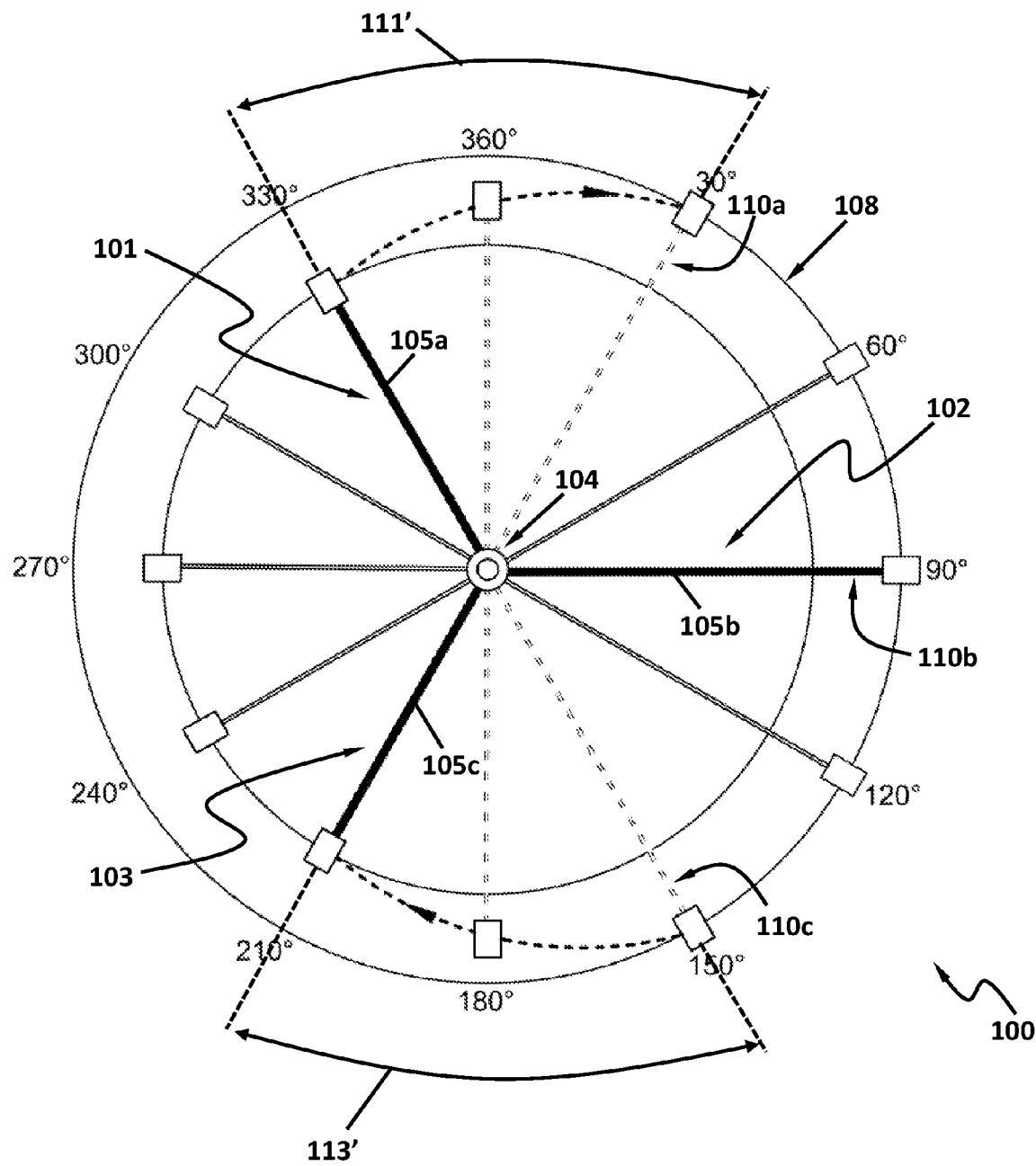

Referring to FIGS. 3A and 3B, in an aspect, well planned and dynamic changes in the length of the arms 105a-c may be utilized to keep the GPG system 100 in continuous operation. Arms 105a-c may be configured with fixed arm portions and retractable portions 110a-c to allow for making changes to their length. According to some implementations, the length of arms 105a-c may be changed, for example by extending/retracting the retractable portions 110a-c of the arms 105a-c. Once a retractable portion of an arm is fully extended, length of the arm is at a maximum level and once the retractable portion is fully retracted, the length of the arm is at a minimum level. In an exemplary embodiment, in a fully extended state, the length of an arm may be extend to double a standard arm length in an extended state, and in a retracted state, the length of the arm may be one-half the standard arm length. In another exemplary embodiment, the length of the arm may extend to 1.5 times a standard arm length in an extended state, while may retract to length that is ⅔rds the size of the standard arm length.

FIGS. 3A and 3B show how the dynamic change of length of the arms 105a-c may be planned to keep the main shaft 104 in a continuous rotation. Referring to FIGS. 3A and 3B, an increase region 111 and a decrease region 113 may be defined. The increase region 111 may be defined as a region in which the length of an arm may be increased via, for example, extending a retractable portion of the arm. Referring to the implementation shown in FIG. 3A, the increase region 111 may be a 30° arc along trajectory 108 from a vertical angle of, for example about 360° to a vertical angle of about 30°. Referring to another implementation shown in FIG. 3B, the increase region 111' may be a 60° arc from a vertical angle of, for example about 330° to a vertical angle of about 30°. The moment an arm assembly crosses the increase region 111 or 111' along the circular trajectory 108, the retractable portion of the arm may be extended in order to increase the length of the arm assembly.

Referring to FIGS. 3A and 3B, the decrease region 113 may be defined as a region in which the length of an arm may be decreased via, for example, retracting a retractable portion of the arm. Referring to the implementation shown in FIG. 3A, the decrease region 113 may be a 30° arc along trajectory 108 from a vertical angle of, for example about 180° to a vertical angle of about 210°. Referring to the implementation shown in FIG. 3B, the decrease region 113' may be a 60° arc from a vertical angle of, for example about 150° to a vertical angle of about 210°. The moment an arm assembly crosses the decrease region 113 or 113' along the circular trajectory 108, the retractable portion of the arm may be retracted in order to decrease the length of the arm assembly.

In the implementation shown in FIGS. 3A and 3B, a relatively small amount of external energy may be needed for extending/retracting the retractable portions 110a-c of arms 105a-c. This external energy may be consumed, for example, as input energy of an actuator that may be coupled to the retractable portion to drive its linear motion from a fully retracted position to a fully extended position.

Referring to the implementation shown in FIG. 3A, as the arm assembly 101 crosses the increase region 111, its respective retractable portion 110a may be extended, thereby increasing the length of arm assembly 101. Arm 102 crosses decrease region 113 and its respective retractable portion 110b may be retracted, and its length may be decreased. Longer arm 101 may fall along the circular trajectory 108 with a high kinetic energy and may raise shorter arm assemblies 102 and 103 against gravity. Then, as the arm assembly 101, crosses the decrease region 113 and its length is decreased, the arm assembly 103 crosses the increase region 111, its respective retractable portion 110c may be extended and its length is increased. Now, longer arm 103 may fall along the circular trajectory 108 with a high kinetic energy and may raise shorter arm assemblies 101 and 102 against gravity. Then, as the arm assembly 103, crosses the decrease region 113 and its length is decreased, the arm assembly 102 crosses the increase region 111, its respective retractable portion 110b may be extended and its length is increased. Now, longer arm 102 may fall along the circular trajectory 108 with a high kinetic energy and may raise shorter arm assemblies 101 and 103 against gravity. As the arm assemblies 101-103 travel along the circular trajectory 108 in this manner, the main shaft 104 attached with the arm assemblies 101-103 may also rotate about its longitudinal axis.

Referring to the implementation shown in FIG. 3B, as the arm assembly 101 crosses the increase region 111', its respective retractable portion 110a may be extended, thereby increasing the length of arm assembly 101. Concurrently, arm 102 crosses decrease region 113' and its respective retractable portion 110b may be retracted, and its length may be decreased. Longer arm 101 may fall along the circular trajectory 108 with a high kinetic energy and may raise shorter arm assemblies 102 and 103 against gravity. Then, as the arm assembly 101, crosses the decrease region 113' and its length is decreased, the arm assembly 103 crosses the increase region 111', its respective retractable portion 110c may be extended and its length is increased. Now, longer arm 103 may fall along the circular trajectory 108 with a high kinetic energy and may raise shorter arm assemblies 101 and 102 against gravity. Then, as the arm assembly 103, crosses the decrease region 113' and its length is decreased, the arm assembly 102 crosses the increase region 111', its respective retractable portion 110b may be extended and its length is increased. Now, longer arm 102 may fall along the circular trajectory 108 with a high kinetic energy and may raise shorter arm assemblies 101 and 103 against gravity. As the arm assemblies 101-103 travel along the circular trajectory 108 in this manner, the main shaft 104 attached with the arm assemblies 101-103 may also rotate about its longitudinal axis.

Figure 4A:
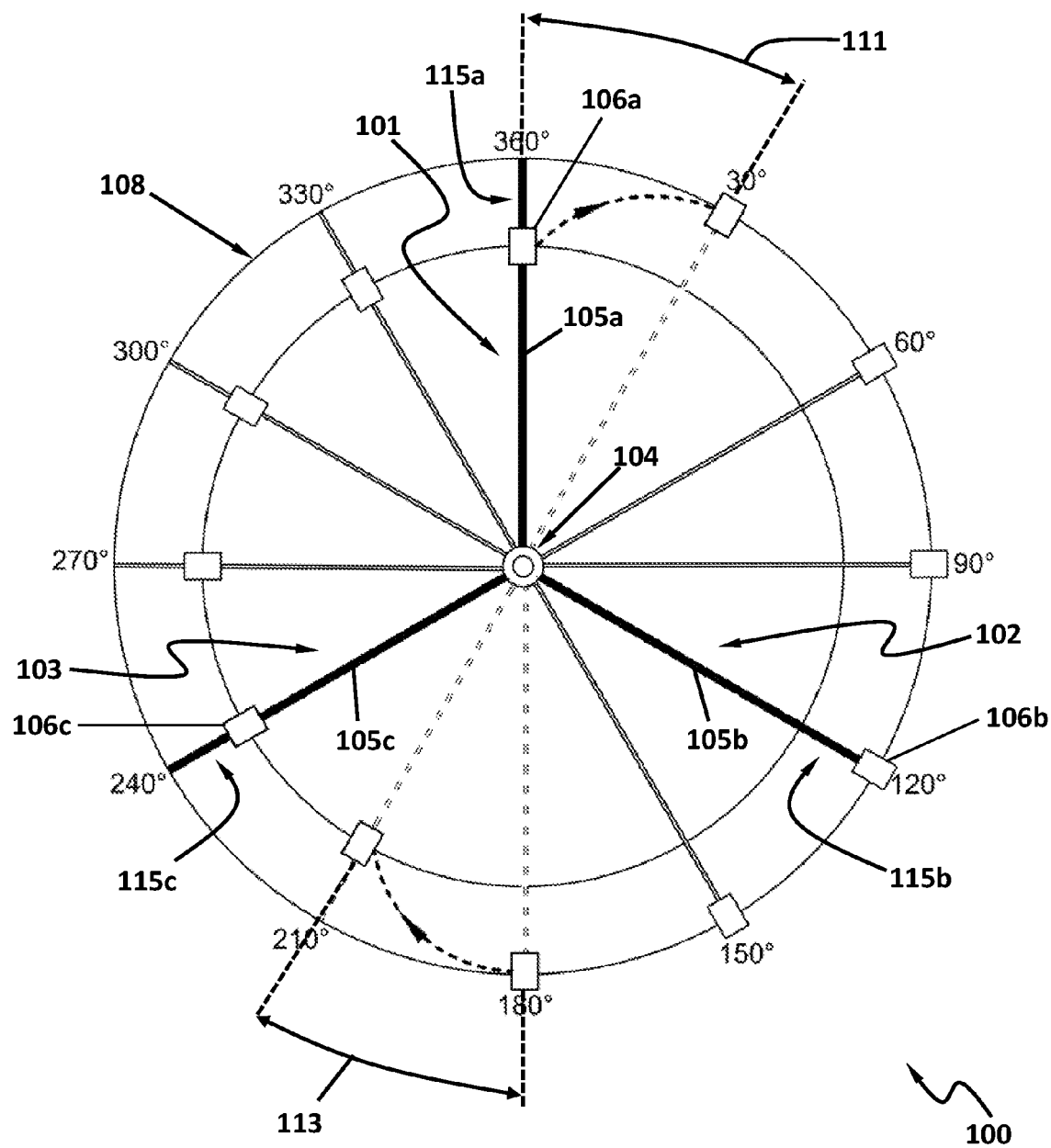
FIGS. 4A and 4B show exemplary implementations of the gravitational power generating system that utilizes dynamic change of position of weight assemblies, according to one or more aspects of the present disclosure.
Figure 4B:
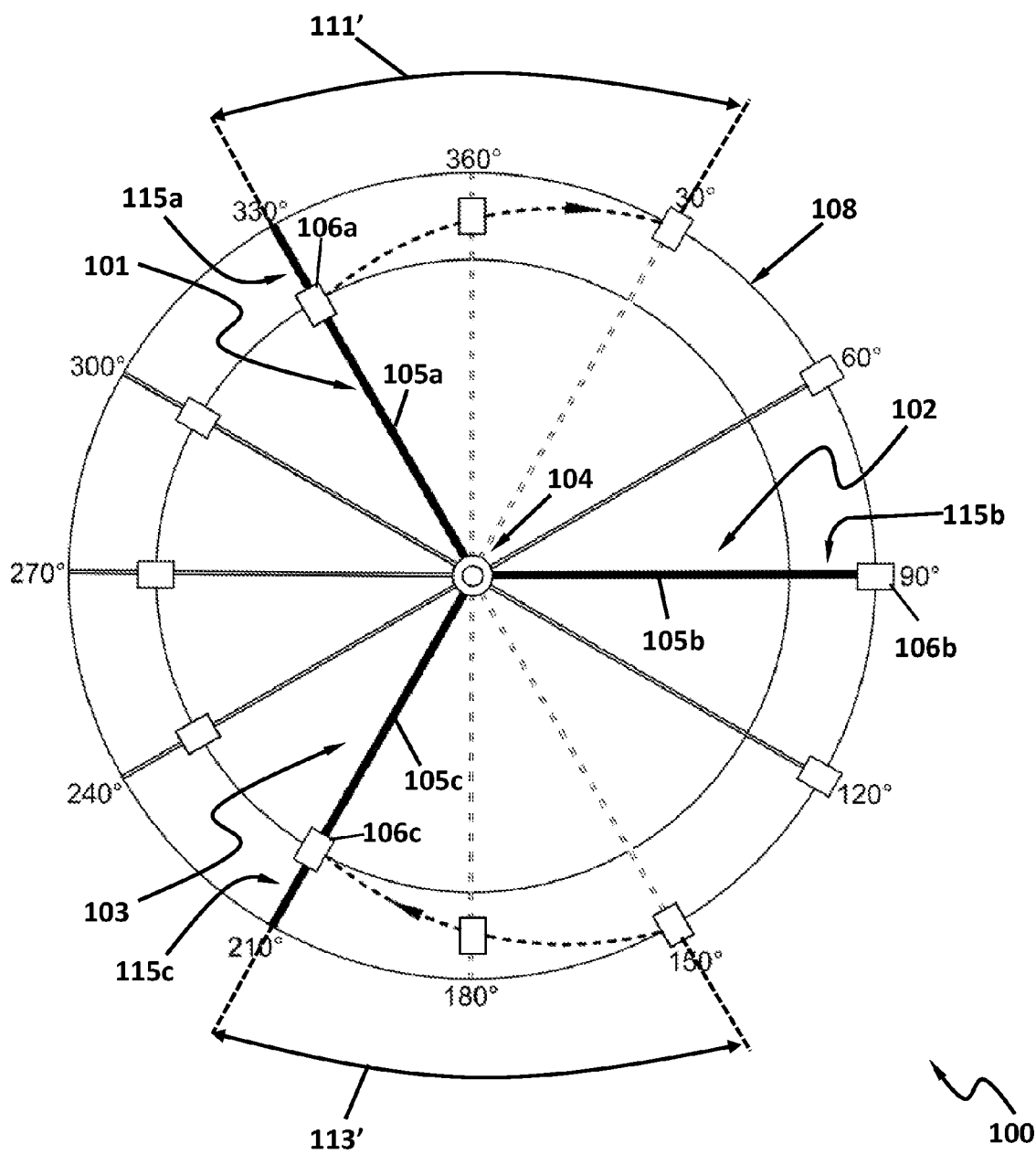

Referring to FIGS. 4A and 4B, in an aspect, well planned and dynamic changes in the position of weight assemblies 106a-c on their respective arms 105a-c may be utilized to keep the GPG system 100 in continuous operation. Arm assemblies 101-103 may be configured to allow for changing the position of weight assemblies 106a-c along defined pathways 115a-c on their respective arms 105a-c. Moving a weight assembly to the distal end of its respective arm may correspond to extending the length of the arm to a maximum. Moving a weight assembly towards the proximal end of its respective arm may correspond to reducing the length of arm. As used herein, increasing the position of a weight assembly, means moving a weight assembly towards the distal end of its respective arm and decreasing the position of a weight assembly means moving the weight assembly towards the proximal end of its respective arm.

FIGS. 4A and 4B show how the dynamic change of the position of weight assemblies 106a-c on their respective arms 105a-c may be planned to keep the main shaft 104 in a continuous rotation. Referring to FIGS. 4A and 4B, an increase region 111 and a decrease region 113 may be defined. The increase region 111 may be defined as a region in which a weight assembly may be moved towards the distal end of its respective arm. Referring to the implementation shown in FIG. 4A, the increase region 111 may be a 30° arc along trajectory 108 from a vertical angle of, for example about 360° to a vertical angle of about 30°. Referring to another implementation shown in FIG. 4B, the increase region 111' may be a 60° arc from a vertical angle of, for example about 330° to a vertical angle of about 30°. The moment an arm assembly crosses the increase region 111 or 111' along the circular trajectory 108, its respective weight assembly may move towards the distal end of the arm.

Referring to FIGS. 4A and 4B, the decrease region 113 may be defined as a region in which a weight assembly moves towards the proximal end of its respective arm in a defined pathway. Referring to another implementation shown in FIG. 4A, the decrease region 113 may be a 30° arc from a vertical angle of, for example about 180° to a vertical angle of about 210°. Referring to the implementation shown in FIG. 4B, the decrease region 113' may be a 60° arc from a vertical angle of, for example about 150° to a vertical angle of about 210°. The moment an arm assembly crosses the decrease region 113 or 113' along the circular trajectory 108, its respective weight assembly may move towards the proximal end of the arm.

In the implementation shown in FIGS. 4A and 4B, a relatively small amount of external energy may be needed for moving the weight assemblies 106a-c on their respective arms 105a-c. This external energy may be consumed, for example, as input energy of an actuator that may be coupled to the weight assemblies to drive their linear movement along a predefined pathway. According to some implementations, the predefined pathway may be defined as a path that may start from the proximal ends of the arms to a point on the arm with a distance of about a quarter of the length of the arms from their distal ends.

Referring to the implementation shown in FIG. 4A, as the arm assembly 101 crosses the increase region 111, its respective weight assembly 106a may move on pathway 115a towards it distal end. Arm 102 crosses decrease region 113 and its respective weight assembly 106b may move on pathway 115b towards its proximal end. The arm 101 with its weight assembly 106a in its distal end may fall along the circular trajectory 108 with a high kinetic energy and may raise the arm assemblies 102 and 103 with their weight assemblies 106b, 106c away from their distal end, against gravity. Then, as the arm assembly 101, crosses the decrease region 113 and its weight assembly 106a moves on pathway 115a towards its proximal end, the arm assembly 103 crosses the increase region 111 and its weight assembly 106c moves on pathway 115c to its distal end. Now, the arm 103 may fall along the circular trajectory 108 with a high kinetic energy and may raise arm assemblies 101 and 102 against gravity. Then, as the arm assembly 103, crosses the decrease region 113 and its weight assembly 106c moves on pathway 115c towards its proximal end, the arm assembly 102 crosses the increase region 111 and its weight assembly 106b moves on pathway 115b to its distal end. Now, the arm 102 may fall along the circular trajectory 108 with a high kinetic energy and may raise arm assemblies 101 and 103 against gravity. As the arm assemblies 101-103 travel along the circular trajectory 108 in this manner, the main shaft 104 attached with the arm assemblies 101-103 may also rotate about its longitudinal axis.

Referring to the implementation shown in FIG. 4B, as the arm assembly 101 crosses the increase region 111', its respective weight assembly 106a may move on pathway 115a towards it distal end. Concurrently, arm 102 crosses decrease region 113' and its respective weight assembly 106b may move on pathway 115b towards its proximal end. The arm 101 with its weight assembly 106a in its distal end may fall along the circular trajectory 108 with a high kinetic energy and may raise the arm assemblies 102 and 103 with their weight assemblies 106b, 106c away from their distal end, against gravity. Then, as the arm assembly 101, crosses the decrease region 113' and its weight assembly 106a moves on pathway 115a towards its proximal end, the arm assembly 103 crosses the increase region 111' and its weight assembly 106c moves on pathway 115c to its distal end. Now, the arm 103 may fall along the circular trajectory 108 with a high kinetic energy and may raise arm assemblies 101 and 102 against gravity. Then, as the arm assembly 103, crosses the decrease region 113' and its weight assembly 106c moves on pathway 115c towards its proximal end, the arm assembly 102 crosses the increase region 111' and its weight assembly 106b moves on pathway 115b to its distal end. Now, the arm 102 may fall along the circular trajectory 108 with a high kinetic energy and may raise arm assemblies 101 and 103 against gravity. As the arm assemblies 101-103 travel along the circular trajectory 108 in this manner, the main shaft 104 attached with the arm assemblies 101-103 may also rotate about its longitudinal axis.

Figure 5A:
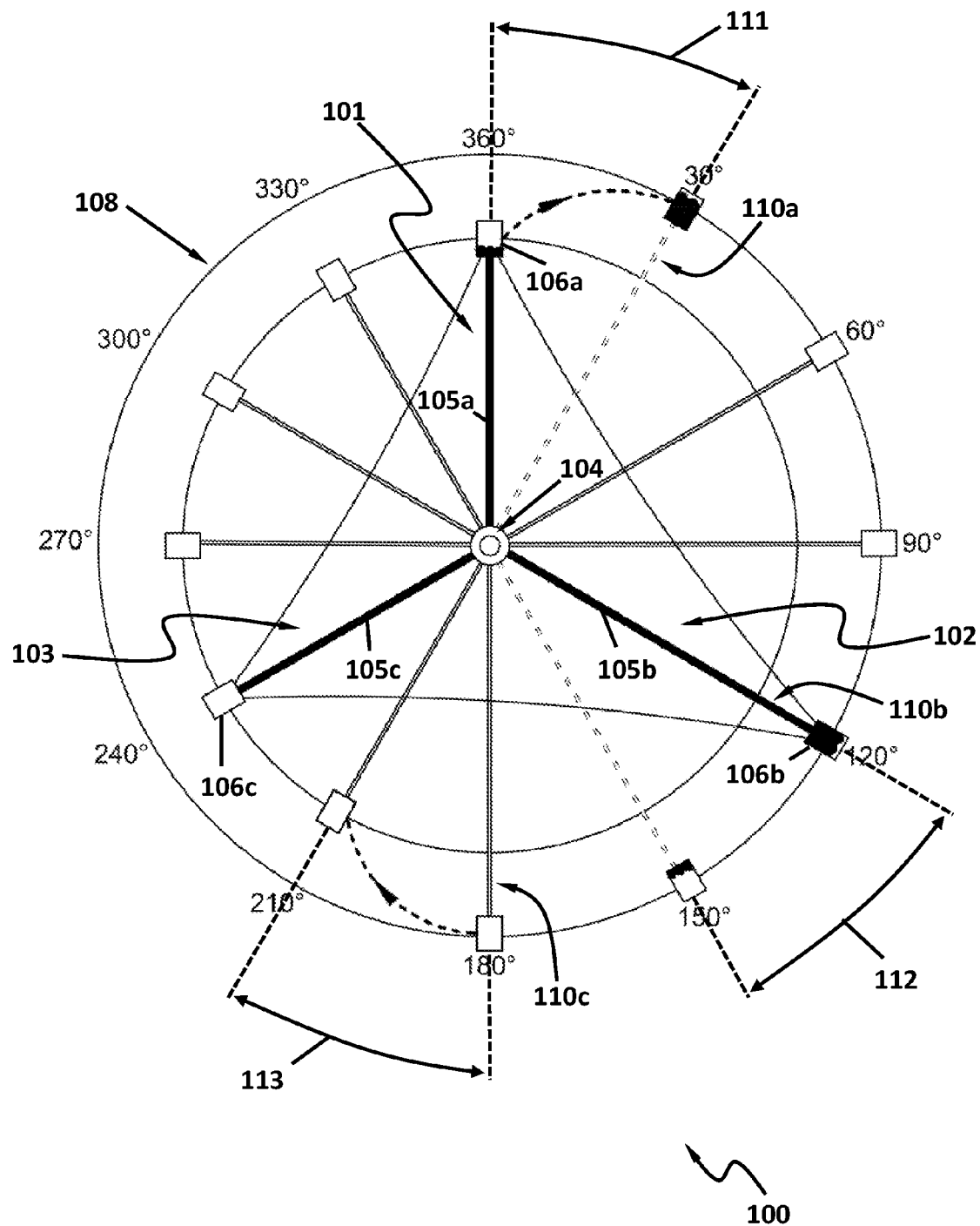
FIGS. 5A and 5B show exemplary implementations of the gravitational power generating system that utilizes dynamic change of length of arm assemblies and mass of weight assemblies, according to one or more aspects of the present disclosure.
Figure 5B:
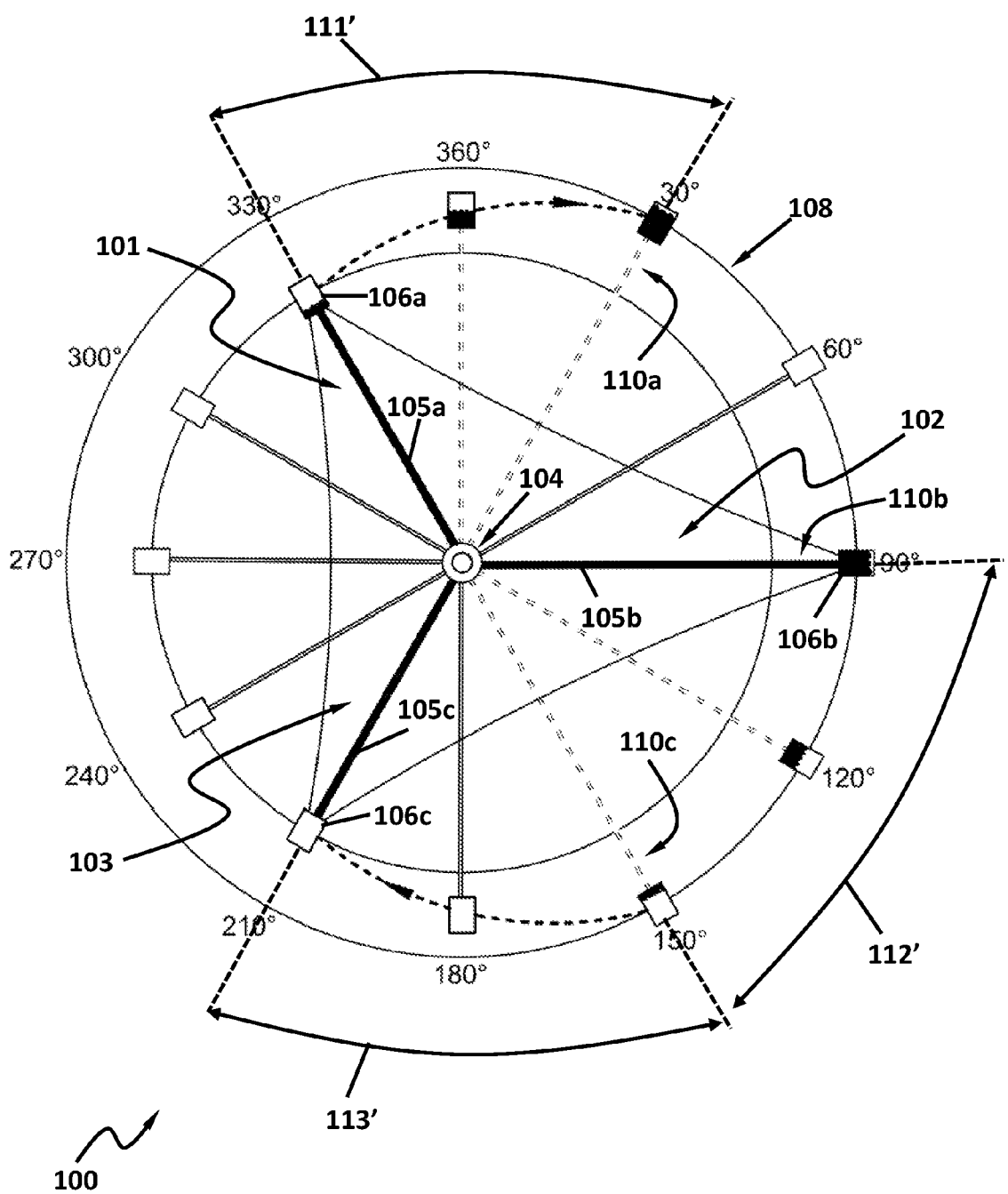

Referring to FIGS. 5A and 5B, in an aspect, well planned and dynamic changes in both the length of the arms 105a-c and mass of weight assemblies 106a-c may be utilized to keep the GPG system 100 in continuous operation. Referring to FIGS. 5A and 5B, an increase region 111 and two decrease regions 112 and 113 may be defined. The increase region 111 may be defined as a region in which the length of an arm and the mass of its respective weight assembly may be increased. Referring to the implementation shown in FIG. 5A, the increase region 111 may be a 30° arc along trajectory 108 from a vertical angle of, for example about 360° to a vertical angle of about 30°. Referring to another implementation shown in FIG. 3B, the increase region 111' may be a 60° arc from a vertical angle of, for example about 330° to a vertical angle of about 30°. The moment an arm assembly crosses the increase region 111 or 111' along the circular trajectory 108, the retractable portion of the arm may be extended in order to increase the length of the arm assembly and a fluid may be loaded inside its respective weight assembly in order to increase the mass of the arm assembly.

Referring to FIGS. 5A and 5B, a decrease region 112 may be defined as a region in which the mass of a weight assembly may be decreased and another decrease region 113 may be defined as a region in which the length of a corresponding arm may be decreased. Referring to the implementation shown in FIG. 3A, the decrease region 113 may be a 30° arc from a vertical angle of, for example about 180° to a vertical angle of about 210° and the decrease region 112 may be a 30° arc from a vertical angle of, for example about 120° to a vertical angle of about 150°. Referring to another implementation shown in FIG. 3B, the decrease region 113' may be a 60° arc from a vertical angle of, for example about 150° to a vertical angle of about 210°. The decrease region 112' may be a 60° arc from a vertical angle of, for example about 90° to a vertical angle of about 150°. The moment an arm assembly crosses the decrease region 112 or 112' along the circular trajectory 108, the fluid may be discharged from its corresponding weight assembly in order to decrease the mass of the arm assembly and the moment the arm passes the decrease region 113 or 113' along the circular trajectory 108, the retractable portion of the arm may be retracted in order to decrease the length of the arm assembly.

Referring to the implementation shown in FIG. 5A, as the arm assembly 101 crosses the increase region 111, its respective retractable portion 110a may be extended, thereby increasing the length of arm assembly 101 and concurrently a fluid may be loaded inside its respective weight assembly 106a, thereby increasing its mass. Concurrently, arm assembly 102 crosses decrease region 112 and the fluid may be discharged from its respective weight assembly 106b, and its mass may be decreased, then as arm assembly 102 crosses decrease region 113 its respective retractable portion 110b may be retracted, and its length may be decreased as well. Longer and heavier arm 101 may fall along the circular trajectory 108 with a high kinetic energy and may raise shorter and lighter arm assemblies 102 and 103 against gravity. Then, as the arm assembly 101, crosses the decrease region 112 and its mass is decreased, the arm assembly 103 crosses the increase region 111 and its length and mass are increased. After that the arm assembly 101, crosses the decrease region 113 and its length is decreased as well. Now, longer and heavier arm 103 may fall along the circular trajectory 108 with a high kinetic energy and may raise shorter and lighter arm assemblies 101 and 102 against gravity. Then, as the arm assembly 103, crosses the decrease region 112 and its mass is decreased, the arm assembly 102 crosses the increase region 111 and its length and mass are increased. After that the arm assembly 103, crosses the decrease region 113 and its length is decreased as well. Now, longer and heavier arm 102 may fall along the circular trajectory 108 with a high kinetic energy and may raise shorter and lighter arm assemblies 101 and 103 against gravity. As the arm assemblies 101-103 travel along the circular trajectory 108 in this manner, the main shaft 104 attached with the arm assemblies 101-103 may also rotate about its longitudinal axis.

Referring to the implementation shown in FIG. 5B, as the arm assembly 101 crosses the increase region 111', its respective retractable portion 110a may be extended, thereby increasing the length of arm assembly 101 and concurrently a fluid may be loaded inside its respective weight assembly 106a, thereby increasing its mass. Concurrently, arm assembly 102 crosses decrease region 112' and the fluid may be discharged from its respective weight assembly 106b, and its mass may be decreased, then as arm assembly 102 crosses decrease region 113' its respective retractable portion 110b may be retracted, and its length may be decreased as well. Longer and heavier arm 101 may fall along the circular trajectory 108 with a high kinetic energy and may raise shorter and lighter arm assemblies 102 and 103 against gravity. Then, as the arm assembly 101, crosses the decrease region 112' and its mass is decreased, the arm assembly 103 crosses the increase region 111' and its length and mass are increased. After that the arm assembly 101, crosses the decrease region 113' and its length is decreased as well. Now, longer and heavier arm 103 may fall along the circular trajectory 108 with a high kinetic energy and may raise shorter and lighter arm assemblies 101 and 102 against gravity. Then, as the arm assembly 103, crosses the decrease region 112' and its mass is decreased, the arm assembly 102 crosses the increase region 111' and its length and mass are increased. After that the arm assembly 103, crosses the decrease region 113' and its length is decreased as well. Now, longer and heavier arm 102 may fall along the circular trajectory 108 with a high kinetic energy and may raise shorter and lighter arm assemblies 101 and 103 against gravity. As the arm assemblies 101-103 travel along the circular trajectory 108 in this manner, the main shaft 104 attached with the arm assemblies 101-103 may also rotate about its longitudinal axis.

In an implementation, the main shaft 104 may be coupled with an electricity generator and it may provide the generator with enough torque to generate electricity, which will be described in more detail later in this disclosure.

Figure 6:
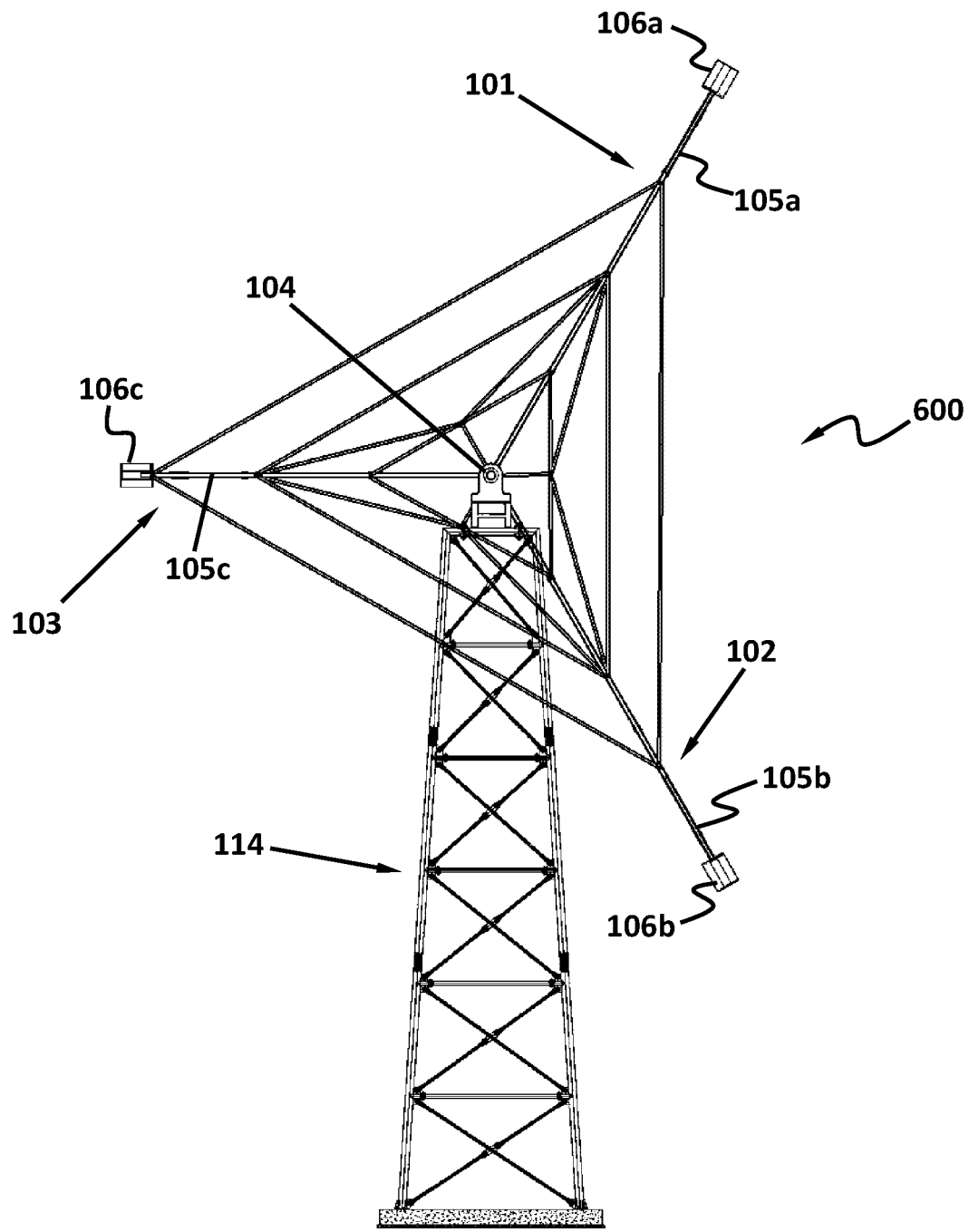
FIG. 6 is a schematic of an exemplary implementation of a gravitational power generating apparatus, according to one or more aspects of the present disclosure.

FIG. 6 illustrates one example of a GPG apparatus 600 configured to provide an example implementation of the FIGS. 1-5 GPG system 100. Referring to the example implementation shown FIG. 6, the GPG apparatus 600 may include three arm assemblies 101-103 that may be attached to a main shaft 104. The main shaft 104 may be mounted on a base 114. According to other implementations, the GPG apparatus 600 may include any number of arm assemblies. The base 114 may be configured to provide enough elevation for the arm assemblies 101-103 to be able to rotate in a vertical circular trajectory. As shown in FIG. 6, arm assemblies 101-103 may include arms 105a-c having adjustable lengths and weight assemblies 106a-c having adjustable mass and adjustable positions on their respective arms. According to an implementation, the arms 105a-c may be configured with a fixed length and the weight assemblies 106a-c may be configured with an adjustable mass and a fixed position on their respective arms. According to another implementation, the arms 105a-c may be configured with a fixed length and the weight assemblies 106a-c may be configured with a fixed mass but an adjustable position on their respective arms. According to yet another implementation, the arms 105a-c may be configured with an adjustable length and the weight assemblies 106a-c may be configured with an adjustable mass and a fixed position on their respective arms. It should be understood by reading this disclosure, that any combination of dynamic changes in adjustable variables (i.e., length of the arms, mass of the weight assembly, and position of the weight assemblies on their respective arms) may be utilized to keep the GPG apparatus of this disclosure in continuous operation.

Figure 7A:
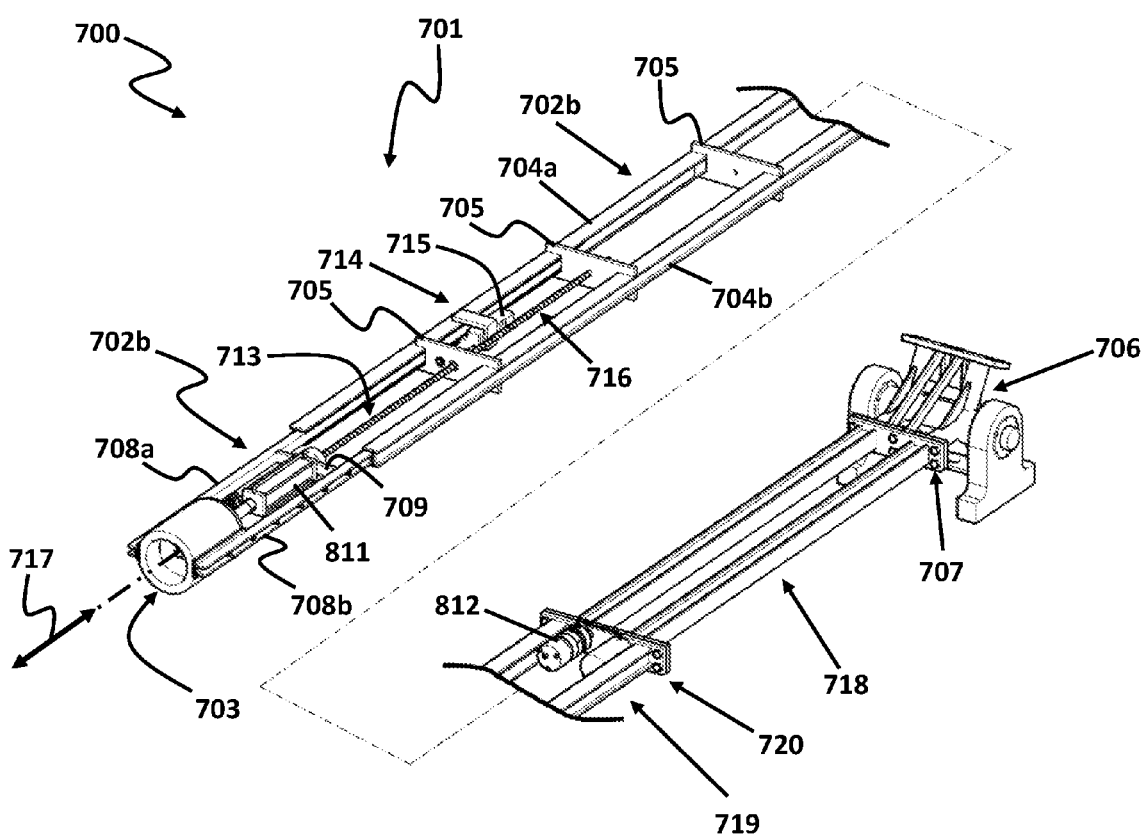
FIG. 7A is a perspective view of an exemplary implementation of an arm assembly, according to one or more aspects of the present disclosure.
Figure 7B:
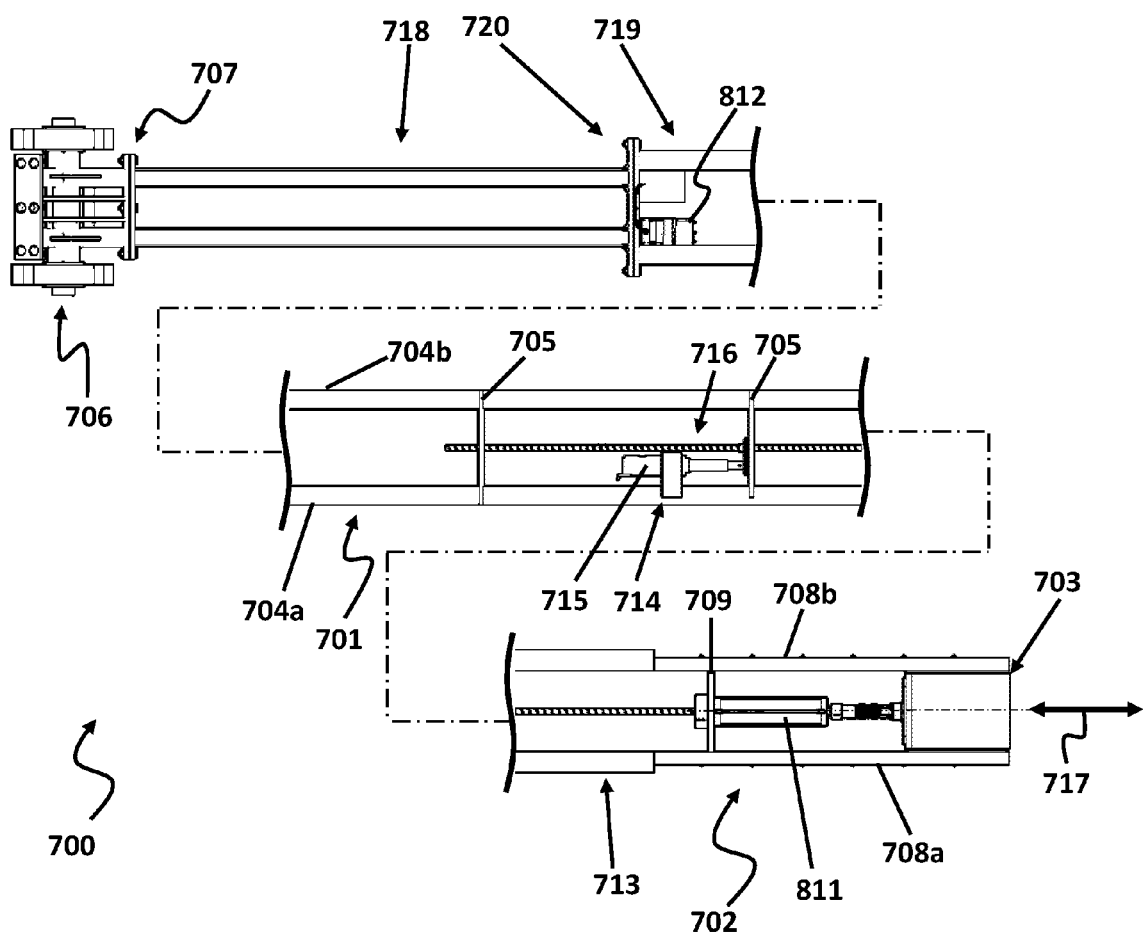
FIG. 7B is a top view of the arm assembly of FIG. 7A.

FIG. 7A illustrates a perspective view of an arm assembly 700, configured to provide an example implementation of FIGS. 1-5 arm assemblies 101-103. FIG. 7B is a top view of the arm assembly 700.

Figure 11:
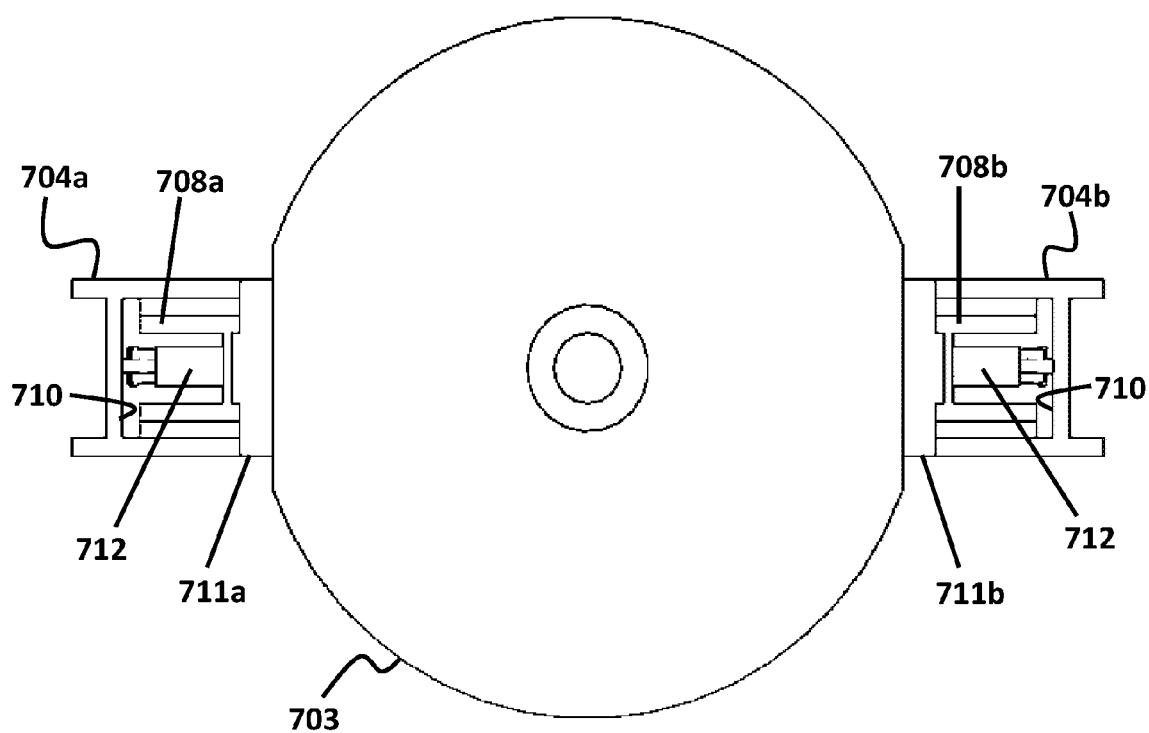
FIG. 11 illustrates a front view of an exemplary implementation of a weight assembly, according to one or more aspects of the present disclosure.

Referring to FIGS. 7A and 7B, arm assembly 700, may include an arm 701 having a fixed arm section 702a and a retractable arm section 702b and a weight assembly 703 that may be attached to the distal end of the retractable arm section 702b. The fixed arm section 702a may include at least one beam. Referring to FIGS. 7A and 7B the fixed arm section 702a may include two beams 704a-b with intermediate bracing 705. The two beams 704a-b may be attached to a main shaft 706 via a flange connection 707. Beams 704a-b may be configured to form a sliding track 713. The retractable arm section 702b may include two beams 708a-b with intermediate bracing 709. Beams 708a-b may be configured as a sliding member which may be slidably received in the sliding track 713 formed by beams 704a-b. Referring to FIG. 11, beams 704a-b may have an I or H cross section. Beams 708a-b may be slidably receivable inside U-shaped channels 710 of beams 704a-b. The weigh assembly 703 may be attached at the distal end of the retractable arm section 702b between beams 708a-b via two attachment members 711a-b at either sides. Beams 708a-b may be configured with a C-shaped cross section and may be configured to house a plurality of sliding wagons 712 that may be utilized to make the sliding movement of beams 708a-b smoother. The retractable arm section 702b may be slidably movable inside the sliding track 713 defined by beams 704a-b of the fixed arm section 702a.

Figure 10:
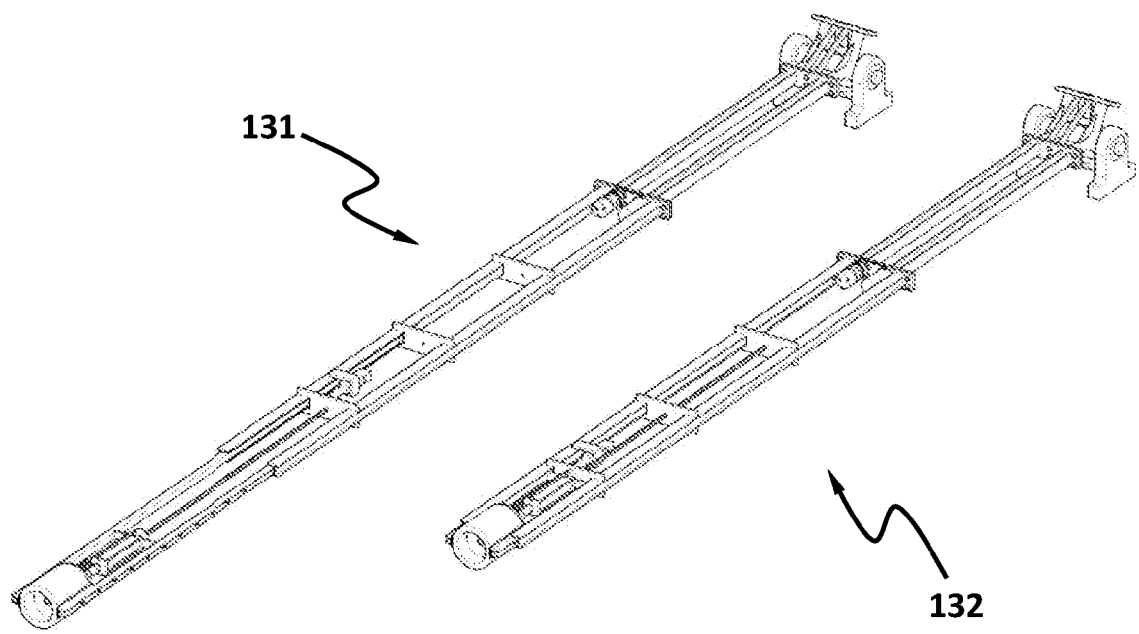
FIG. 10 illustrates an exemplary implementation of an arm assembly in fully retracted and fully extended positions, according to one or more aspects of the present disclosure.
Figure 12:
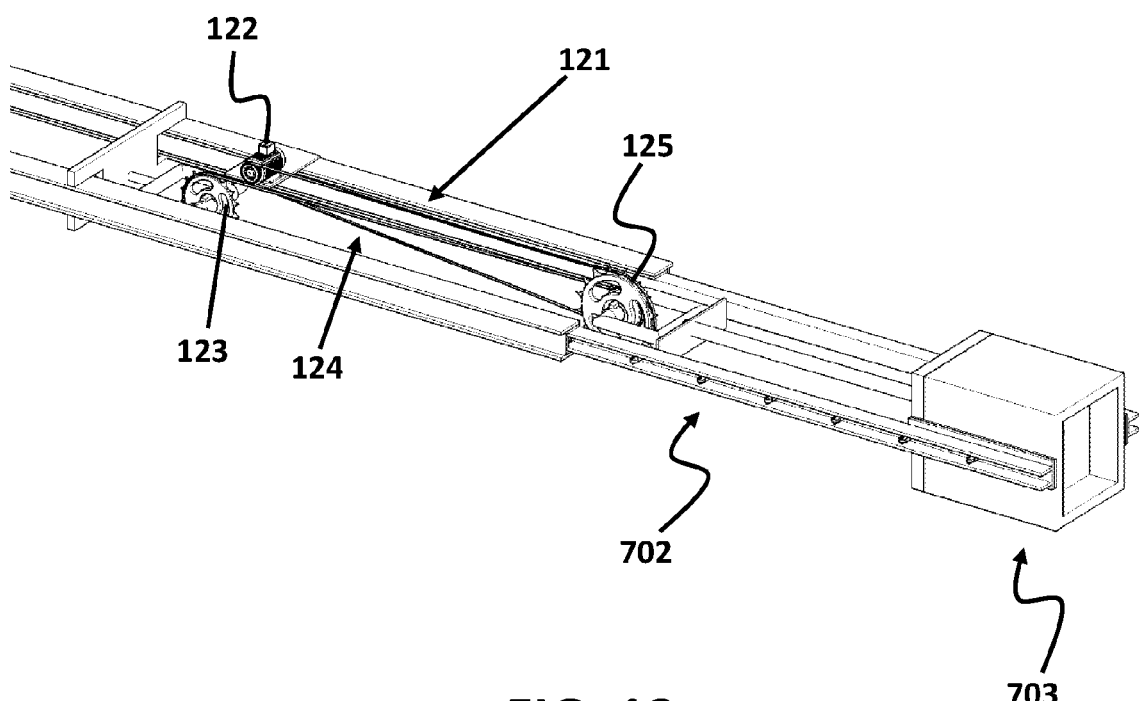
FIG. 12 shows an exemplary implementation of a Sprocket wheel actuating mechanism for extending/retracting a retractable arm section, according to one or more aspects of the present disclosure.

In an implementation, a first actuating mechanism 714 may be utilized to drive the linear sliding movement of the retractable arm section 702b inside the sliding track 713 defined by beams 704a-b. Referring to the implementation shown in FIGS. 7A and 7B, the first actuating mechanism 714 may include a rotary actuator 715 that may be coupled with a ball screw mechanism 716. The ball screw mechanism 716 may be attached to the retractable arm section 702b and it may be configured to transform the rotational movement of the rotary actuator 715 into a linear sliding movement of the retractable arm section 702b along axis 717. FIG. 10 illustrates an example of a fully extended retractable arm section 131 and a fully retracted retractable arm section 132. It should be known by reading this disclosure that the first actuating mechanism 714 may be any other linear actuating mechanism that can be utilized to drive the sliding movement of the retractable arm section 702b. Referring to FIG. 12, for example a gear and chain mechanism 121 may be used to drive the sliding movement of the retractable arm section 702b. The gear and chain mechanism 121 may include a rotary actuator 122, an input gear 123, chain 124, and an output gear 125 and it may be configured to drive a sliding movement of the retractable arm section 702b between a fully extended to a fully retracted position. With further reference to FIG. 12, in an implementation, the weight assembly 703 may be configured with a cubic shape.

Figure 8:
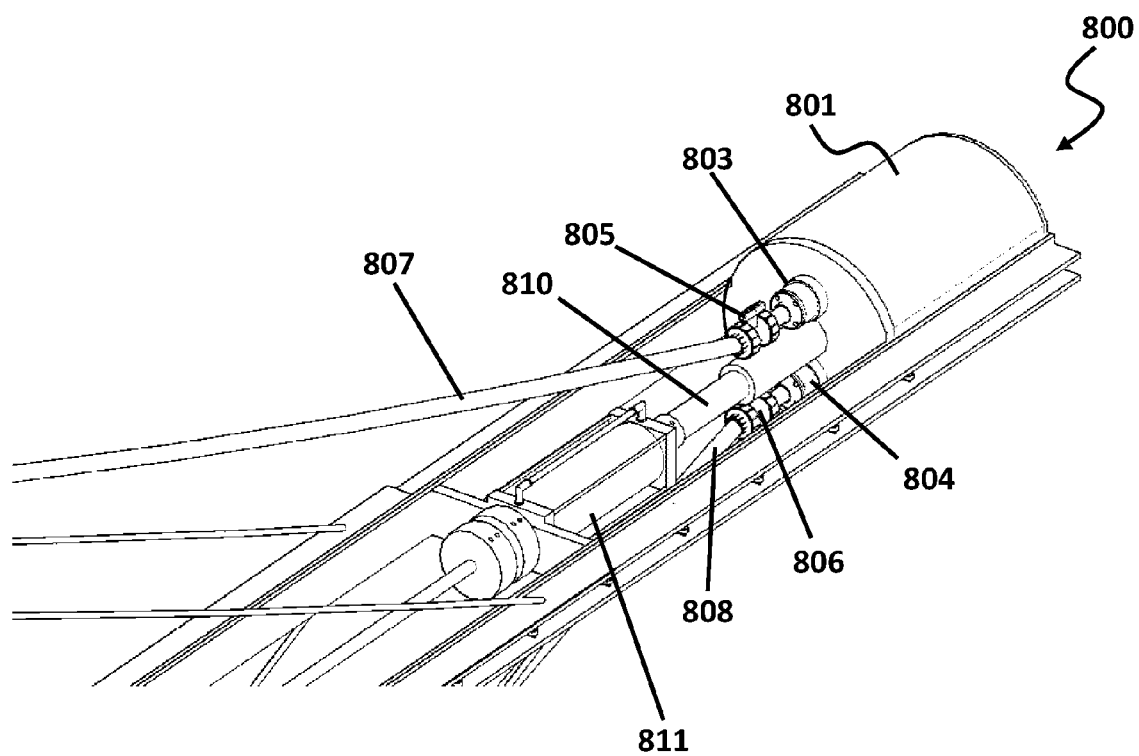
FIG. 8 illustrates an exemplary implementation of a weight assembly, according to one or more aspects of the present disclosure.
Figure 9:
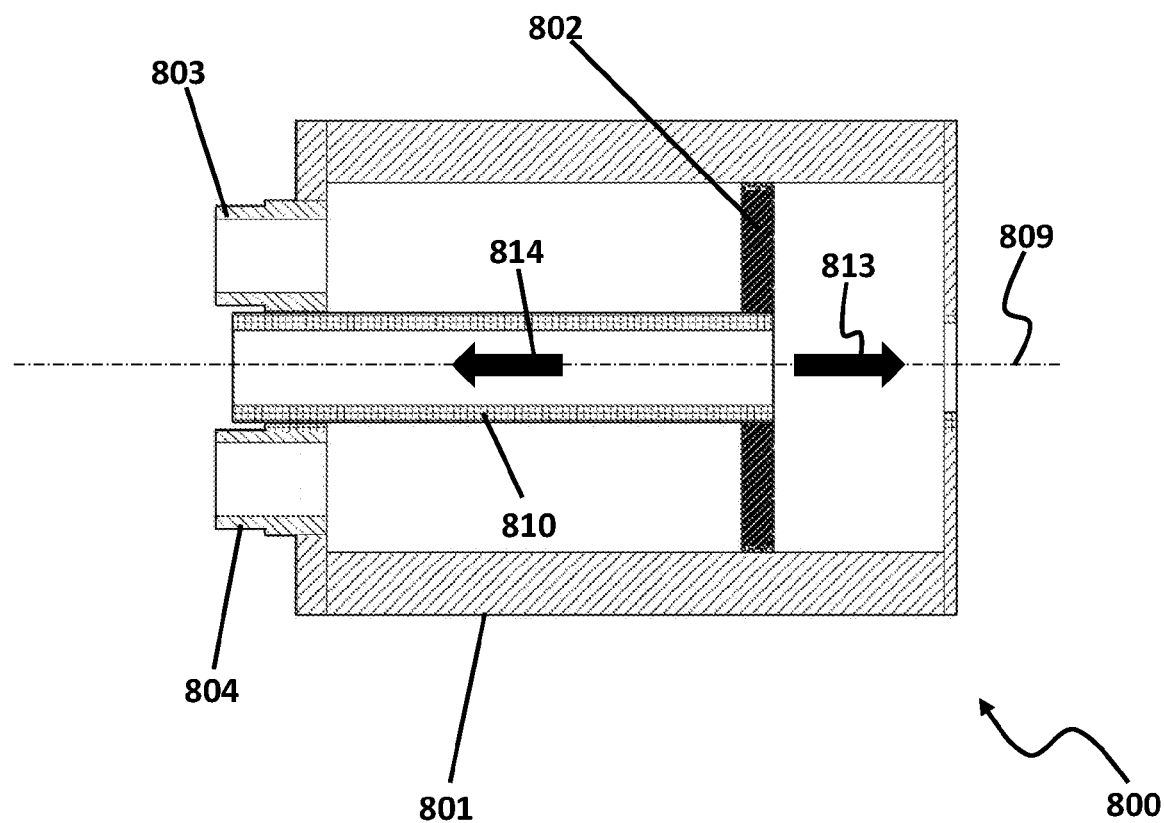
FIG. 9 is a sectional view of an exemplary implementation of a weight assembly, according to one or more aspects of the present disclosure.

FIG. 8 illustrates a weight assembly 800 configured to provide an example implementation of weight assemblies 106a-c (visible and numbered in FIGS. 1-5). Weight assembly 800 may be configured with a cylinder and piston configuration. The weight assembly 800 may include a cylinder 801, a piston (obscured from view in FIG. 8) disposed within the cylinder 801, an inlet 803, and an outlet 804. The inlet 803 and outlet 804 may be provided with valves 805 and 806. The inlet valve 805 may be attached to a hose 807 to receive a fluid and outlet valve 806 may be attached to a hose 808 to discharge the fluid. The inlet valve 805 may be a one-way valve that may only allow loading the fluid into the cylinder 801. The outlet valve 806 may be a one-way valve that may only allow discharging the fluid from the cylinder 801. Referring to FIG. 9, the piston 802 may be movable inside the cylinder 801 along axis 809. The linear movement of the piston 802 inside the cylinder 801 may be driven by a linear actuator that may be coupled to piston rod 810. Referring to FIGS. 8, 7A-7B the linear actuator may be a pneumatic jack 811 that receives compressed air from a compressor 812 mounted on the arm 701. In another implementation, jack 811 may be a hydraulic jack that receives oil from an oil pump mounted on the arm 701. In yet another implementation, a motor can be coupled with the piston 802 to drive its linear movement inside the cylinder 801. Referring to FIG. 9, as the piston 802 moves forward in the direction shown by arrow 813 it sucks the fluid in the cylinder 801 through the inlet valve 805 and as it moves backwards in the direction shown by arrow 814, it discharges the fluid via the outlet valve 806. Referring to FIGS. 8 and 9, the pneumatic jack 811 may be coupled with the piston rod 810 of the weight assembly 800 and upon actuation it may urge the piston 802 to move in and load the fluid in cylinder 801 or to move out and discharge the fluid form cylinder 801.

According to some implementations where the mass of the arm assemblies remains constant throughout the GPG operation, the weight assemblies may be replaced with solid weights with a constant mass.

According to other implementations where the length of the arm remains constant, the retractable arm section may be fixed at its fully extended position, or the arm may be constructed without a retractable section but with a length equal to an arm with a fully extended retractable section.

Referring to FIGS. 7A and 7B, in some implementations, the fixed arm section 702a may include two sections, namely, a first section 718 that may be configured to be attached to the main shaft 706; a second section 719 that may be connected to the first section 718 using a flange connection 720 and may be configured to define the sliding track 713 for the retractable arm section 702b.

In some implementations, the fixed arm section 702a may be configured with a length of about 3L with a first section 718 with an L length and a second section 719 with a 2L length; the retractable arm section 702b may be configured with a length of L. L designates an arbitrary length. In some implementations, L may be at least 1 meter. According to other implementations, L may be at least 6 meters.

Figure 13:
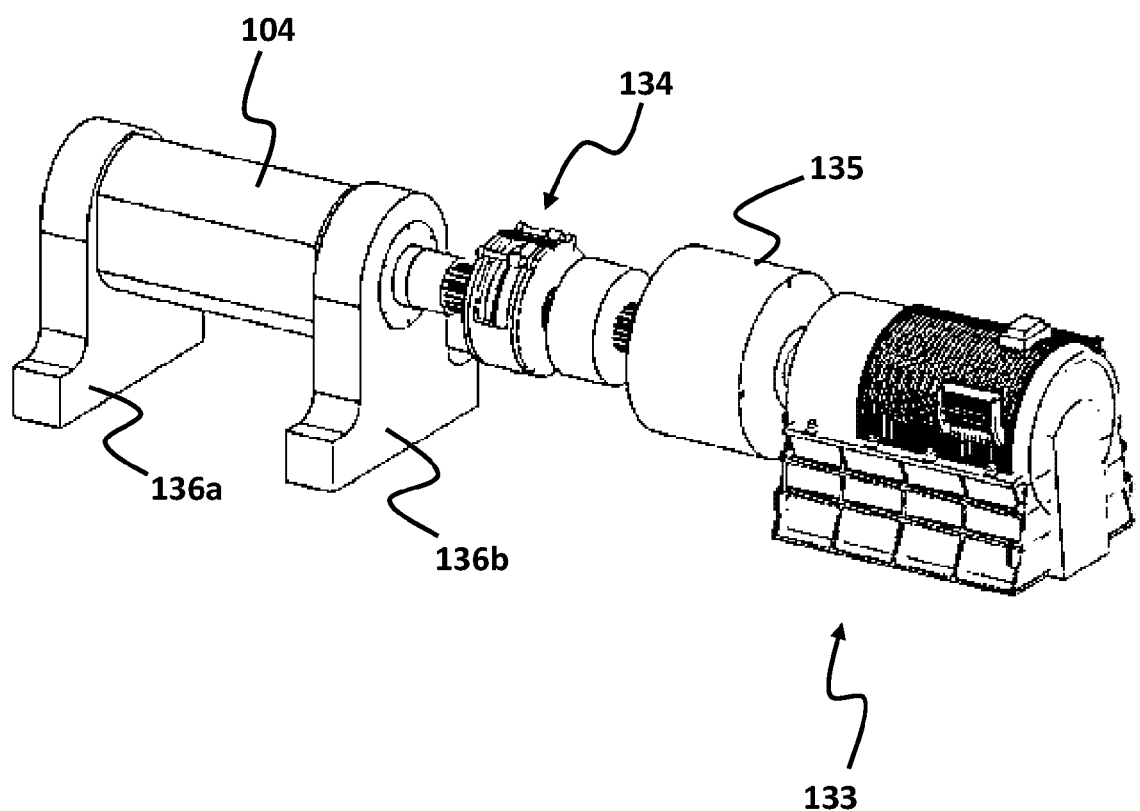
FIG. 13 illustrates a perspective view of a main shaft coupled to a generator, according to exemplary implementations of the present disclosure.

FIG. 13 illustrates an exemplary implementation of main shaft 104 connection to an electricity generator 133. According to this implementation, the main shaft 104 may be coupled with an electricity generator 133 and it may provide the generator 113 with enough torque to generate electricity. Referring to FIG. 13, main shaft 104 may be mounted between tow bearing units 136a-b in order to facilitate its rotational movement. Main shaft 104 may be coupled to a clutching system 134 and the clutching system 134 may be coupled to a gear box 135 and the gearbox 135 may be coupled with the shaft of the generator 133. According to some implementations, the main shaft 104 may be coupled to two generators from either sides. In an implementation the clutching system 134 may be configured to engage and disengage the power transmission from main shaft 104 to generator 133. In another implementation, the gearbox 135 may be configured to provide speed and torque conversions from main shaft 104 to generator 133.

Now the working principle behind the GPG system and apparatus of the present disclosure is described referring to increase and decrease regions defined in FIGS. 2-5 and exemplary embodiments and implementations shown in FIGS. 7A and 7B.

Changing the Mass of an Arm Assembly

Referring to FIGS. 2A and 2B, the moment an arm assembly crosses the increase region 111 or 111' along the circular trajectory 108, a fluid may be loaded inside its respective weight assembly in order to increase the mass of the arm assembly. Referring to FIGS. 7B, 8, and 9, according to some implementations, in order to load the fluid (e.g., oil) into the weight assembly 800, pneumatic jack 811 upon actuation via receiving pressurized air from compressor 812 pushes piston rod 810 and thereby urges piston 802 to move forward in the direction shown by arrow 813. As the piston 802 moves forward, the fluid may be loaded inside cylinder 801 via inlet 803 to increase the mass of weight assembly 800.

Referring to FIGS. 2A and 2B, the moment an arm assembly crosses the decrease region 112 or 112' along the circular trajectory 108, the fluid may be discharged from its corresponding weight assembly in order to decrease the mass of the arm assembly. Referring to FIGS. 7B, 8, and 9, according to some implementations, in order to discharge the fluid (e.g., oil) from the weight assembly 800, pneumatic jack 811 upon actuation via receiving pressurized air from compressor 812 pulls piston rod 810 and thereby urges piston 802 to move backwards in the direction shown by arrow 814. As the piston 802 moves backwards, the fluid may be discharged from cylinder 801 via outlet 804 to decrease the mass of weight assembly 800.

Changing the Length of an Arm Assembly

Referring to FIGS. 3A and 3B, the moment an arm assembly crosses the increase region 111 or 111' along the circular trajectory 108, the retractable portion of the arm may be extended in order to increase the length of the arm assembly. Referring to FIGS. 7A and 7B, rotary actuator 715 coupled with ball screw mechanism 716 may be utilized to drive the linear extending movement of retractable arm section 702b along axis 717. The ball screw mechanism 716 may transform the rotational movement of rotary actuator 715 in a first direction into extending linear motion of retractable arm section 702b.

Referring to FIGS. 3A and 3B, the moment an arm assembly crosses the decrease region 113 or 113' along the circular trajectory 108, the retractable portion of the arm may be retracted in order to decrease the length of the arm assembly. Referring to FIGS. 7A and 7B, rotary actuator 715 coupled with ball screw mechanism 716 may be utilized to drive the linear retracting movement of retractable arm section 702b along axis 717. The ball screw mechanism 716 may transform the rotational movement of rotary actuator 715 in a direction opposite the first direction into retracting linear motion of retractable arm section 702b.

Referring to FIG. 12, in another implementation, a gear-chain mechanism 121 may be utilized to transform the rotational movement of rotary actuator 122 into extending/retracting linear motion of retractable arm section 702b.

The GPG system and apparatus according to one or more aspects of the present disclosure, may amplify the external input energy that is consumed to change the length, weight or a combination of length and weight of the arm assemblies in well planned intervals. The dynamic change in length of the arm assemblies or the dynamic change in the mass or position of the weight assemblies may trigger the gravitational potential energy on the arm assemblies and may urge the arm assemblies along with the main shaft to continuously rotate in the vertical circular trajectory. The rotational kinetic energy of the main shaft may create enough torque to be transferred to a generator via a gearbox to produce electricity. According to some implementations, a cascade of the GPG system and apparatus, as described in this disclosure, may be utilized to multiply the produced electrical energy.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. An apparatus for gravity-based power generation, the apparatus comprising:
    a main shaft connected to an electric generator; and
    a plurality of radially extending arm assemblies attached to the main shaft from their proximal ends and rotatable therewith in a vertical trajectory,
    wherein each arm assembly of the arm assemblies includes a respective adjustable mass attached to the distal end of the arm and has a respective adjustable length,
    wherein the arm assemblies are kept in a continuous rotational movement along the vertical trajectory by increasing or decreasing the respective adjustable mass using a fluid motor pump and increasing or decreasing the respective adjustable length using a linear actuator for each arm assembly in predefined regions along the vertical trajectory, and
    wherein the rotational movement of the arm assemblies urges the main shaft to rotate about its longitudinal axis.

2. The apparatus according to claim 1, wherein the predefined regions include an increase region and a decrease region.

3. The apparatus according to claim 2, wherein:
    the increase region is a region wherein the respective adjustable mass is increased and the adjustable length is increased, and
    the decrease region is a region wherein the respective adjustable mass is decreased and the respective length is decreased.

4. The apparatus according to claim 3, wherein the respective adjustable mass is increased by adding fluid to the respective adjustable mass and the respective adjustable mass is decreased by removing fluid from the respective adjustable mass.

5. The apparatus according to claim 4, wherein the increase region covers 30° of the vertical circular trajectory from 0° to 30° and a decrease region covers 30° of the vertical circular trajectory from 180° to 210°.

6. A method for generating gravity-based power generation, comprising:
    generating power by causing rotational movement of a plurality of radially extending arm assemblies that are attached to a main shaft of a power generator from their proximal ends and rotatable therewith in a vertical trajectory by:
    increasing or decreasing a respective adjustable mass attached to a respective distal end using a fluid motor pump and increasing or decreasing a respective adjustable length using a linear actuator for each arm assembly of the arm assemblies in predefined regions along the vertical trajectory.

7. The method according to claim 6, wherein the predefined regions include an increase region and a decrease region.

8. The method according to claim 7, wherein
    the increase region is a region wherein the respective adjustable mass is increased and the adjustable length is increased, and
    the decrease region is a region wherein the respective adjustable mass is decreased and the respective length is decreased.

9. The method according to claim 8, wherein the respective adjustable mass is increased by adding fluid to the respective adjustable mass and the respective adjustable mass is decreased by removing fluid from the respective adjustable mass.

10. The method of claim 9, wherein the increase region covers 30° of the vertical circular trajectory from 0° to 30° and a decrease region covers 30° of the vertical circular trajectory from 180° to 210°.

* * * * *